(12) United States Patent
Matsumoto

(10) Patent No.: US 7,019,775 B2
(45) Date of Patent: Mar. 28, 2006

(54) IMAGE SENSING APPARATUS AND CONTROL METHOD THEREOF

(75) Inventor: Toshio Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/245,951

(22) Filed: Sep. 18, 2002

(65) Prior Publication Data

US 2003/0071906 A1   Apr. 17, 2003

(30) Foreign Application Priority Data

Sep. 21, 2001   (JP)   ............................. 2001-288646

(51) Int. Cl.
*H04N 5/225*   (2006.01)

(52) U.S. Cl. .............. 348/220.1; 348/222.1; 348/296; 348/364

(58) Field of Classification Search ............. 348/220.1, 348/221.1, 348, 350, 362, 364, 370, 371, 348/316, 320, 322, 324; 396/234
See application file for complete search history.

(56) References Cited

U.S. PATENT DOCUMENTS

| | | | |
|---|---|---|---|
| 5,450,163 A * | 9/1995 | Iwasaki | 396/234 |
| 6,192,166 B1 * | 2/2001 | Mori et al. | 382/312 |
| 6,337,713 B1 * | 1/2002 | Sato | 348/311 |
| 6,571,022 B1 * | 5/2003 | Okisu et al. | 382/294 |
| 6,608,648 B1 * | 8/2003 | Bean | 348/211.7 |
| 6,791,615 B1 * | 9/2004 | Shiomi et al. | 348/323 |
| 2002/0044779 A1 * | 4/2002 | Shiomi et al. | 396/429 |
| 2002/0140830 A1 * | 10/2002 | Shirakawa et al. | 348/245 |

FOREIGN PATENT DOCUMENTS

EP   1033868 A1 *   9/2000

* cited by examiner

*Primary Examiner*—Ngoc-Yen Vu
*Assistant Examiner*—Carramah J. Quiett
(74) *Attorney, Agent, or Firm*—Morgan & Finnegan, LLP

(57) ABSTRACT

An image sensing apparatus capable of operating in at least a single-shot mode and a sequential mode, includes: an image sensor that outputs charge signals from a plurality of divided areas. A plurality of image processing units which respectively process the charge signals and output a plurality of image signals. A light source illuminates the plurality of divided areas of the image sensing device. Correction data is calculated on the basis of a plurality of image signals obtained by reading charge signals from the plurality of divided areas of the image sensing device, illuminating the image sensing device with the light source, and processing the read charge signals by the plurality of image processing units. The image signals are corrected using the correction data and combined to generate a combined image signal of a single image.

10 Claims, 15 Drawing Sheets

IMAGE SENSING APPARATUS AND CONTROL METHOD THEREOF

FIELD OF THE INVENTION

The present invention relates to an image sensing apparatus and a control method thereof, and in particular, to an image sensing apparatus that synthesizes image signals of a plurality of image sensing areas, independently outputted from the respective areas, into a single image and a control method of the image sensing apparatus.

BACKGROUND OF THE INVENTION

FIG. 14 is a block diagram illustrating a configuration of a conventional digital still camera.

In this digital camera, when a user operates a camera operation switch 201 (consists of a main switch, a release switch, etc. in a camera), a total control CPU 200 detects a state change of the camera operation switch 201, and supplies power to respective circuit blocks.

An image of an object within an imaging area is formed on an image sensing device 204 through main image sensing optical systems 202 and 203, and is converted into an analog electric signal. The analog electric signal from the image sensing device 204 is processed by a CDS/AGC circuit 205, then sequentially converted into a digital signal in an A/D converter 206 pixel by pixel.

A driver circuit 207 controls the horizontal and vertical operation of the image sensing device 204 on the basis of a signal from a timing generator 208 which determines the entire operation timing, thereby an image sensing device 204 outputs an image signal.

Similarly, the CDS/AGC circuit 205 and the A/D converter 206 also operate on the basis of the timing signal provided by the timing generator 208.

Reference numeral 209 denotes a selector that selects a signal on the basis of a signal from the CPU 200. An output from the A/D converter 206 is inputted into a memory controller 215 through a selector 209, and all signal outputs are transmitted to a frame memory 216. Therefore, since all the pixel data of every image sensing frame are temporarily stored in the frame memory 216 in this case, all the pixel data of photographed images are written in the frame memory 216 in continuous shooting and the like.

After writing into the frame memory 216, by the control of the memory controller 215, the contents of the frame memory 216 storing pixel data are transmitted to a camera digital signal processing unit (DSP) 210 through the selector 209. In the camera DSP 210, R, G and B signals are generated based on each pixel data of each image stored in the frame memory 216.

Usually, before image sensing, a monitor display 212 performs finder display etc. by periodically transmitting the generated R, G and B signals to video memory 211 (every frame).

When a user directs recording of an image by operating the camera operation switch 201, each pixel data for one frame is read from the frame memory 216 in response to a control signal from the CPU 200, and after performing image processing in the camera DSP 210, each pixel data is temporarily stored in work memory 213.

Then, the data in the work memory 213 is compressed in a compression/decompression section 214 on the basis of a predetermined compression format, and the compressed data is stored in external nonvolatile memory (or external memory) 217. Usually, nonvolatile memory such as flash memory is used as the external nonvolatile memory 217.

Further, when observing photographed image data, data that is compressed and stored in the external memory 217 is decompressed to the normal data of every pixel by the compression/decompression section 214. A photographed picture is displayed on the monitor display 212 by transmitting the decompressed data of every pixel to the video memory 211.

Thus, a usual digital camera has such structure that an output from the image sensing device 204 is converted into image data through a signal processing circuit at almost real time, and the result is outputted to memory or a monitor circuit.

In a digital camera system like the above, in order to improve performance, such as continuous shooting (for example, to achieve a rate of 10 frames/sec), it is necessary to improve the system itself, including an image sensing device, such as to increase reading speed from the image sensing device and to increase writing speed of data from image sensing device into frame memory etc.

As one of improvement methods therefor, as shown in FIG. 15, known is a two-output type device in which a horizontal CCD, which is an image sensing device, is divided into two regions, and signals are outputted by each region. FIG. 15 briefly shows the structure of a two-output type CCD device. In the CCD shown in FIG. 15, charges of the respective pixels generated in photo diode sections 190 are transmitted to vertical CCDs 191 all at once at certain predetermined timing. Then, the charges in the vertical CCDs 191 of one horizontal line are transmitted to the horizontal CCDs 192 and 193 at the next timing.

In the structure shown in FIG. 15, the horizontal CCD 192 transmits the charges toward an amplifier 194 on the left-hand side at every transfer clock. Further, the horizontal CCD 193 transmits the charges toward an amplifier 195 on the right-hand side at every transfer clock. Thus, the image data of this CCD is read out in such a manner that the image is divided into right and left areas bordering on the center of a screen.

Usually, the amplifiers 194 and 195 are formed within a CCD device. Nevertheless, since they are considerably apart from each other in layout, the relative characteristics of both amplifiers 194 and 195 do not necessarily completely coincide. For this reason, signal levels of the right and left outputs are matched by adjusting external adjusting sections 197 and 199 when the outputs from the amplifiers 194 and 195 are processed by separate CDS/AGC circuits 196 and 198, respectively.

As described above, a method for simultaneously reading signals from a plurality of output channels to realize an image sensing device capable of performing high-speed readout is indispensable technology so as to bring future digital cameras further close to silver halide cameras. Note, products with the specification of 8 frames/sec have already realized in silver halide cameras of a single-lens reflex type.

However, although a plurality of output channels are advantageous in speed, the plurality of output channels are apparently disadvantageous, in comparison with a one-output channel, in the matching property of output levels.

With a simple manually adjusting method such as analog adjustment in a conventional CDS/AGC circuit section, and digital adjustment which adjusts output levels of both channels to match each other after A/D conversion, even if the adjustment is closely made in manufacturing processes, a value of, e.g., a volume (VR) resistor changes in according with environmental conditions. Further, the possibility that temperature characteristics of the two CDS/AGC circuits perfectly coincides with each other is very rare.

Usually, if the relative precision between the right and left output channels exceeds ±1% when such a method of reading an image sensing device is performed, the imbalance of their boundary is clearly seen on a screen.

SUMMARY OF THE INVENTION

The present invention has been made in consideration of the above situation, and has as its object to properly correct differences between image signals of a plurality of areas while maintaining a high-speed image sensing feature in an image sensing apparatus that processes a plurality of image signals independently outputted from the plurality of areas and synthesizes the image signals into a single image.

According to the present invention, the foregoing object is attained by providing an image sensing apparatus capable of operating in at least a single-shot mode and a sequential mode, comprising:

an image sensing device which senses an optical image of an object and outputs charge signals, wherein an image sensing area thereof is divided into a plurality of areas and the charge signals are read out from the respective divided areas;

a plurality of image processing units adapted to respectively process the charge signals read out from the plurality of divided areas of the image sensing device and output a plurality of image signals;

a light source adapted to illuminate the plurality of divided areas of the image sensing device;

a correction data acquisition unit adapted to acquire correction data for correcting a difference, resulted from variation in characteristics of the plurality of image processing units, between a plurality of image signals on the basis of a plurality of image signals obtained by reading charge signals from the plurality of divided areas of the image sensing device with shielding external light toward the image sensing device and illuminating the image sensing device with the light source, and processing the read charge signals by the plurality of image processing units;

a correction unit adapted to correct the plurality of image signals using the correction data;

a combining unit adapted to combine the plurality of image signals corrected by the correction unit to generate a combined image signal of a single image; and a controller adapted to control to obtain correction data by the correction data acquisition unit for each image sensing processing in the single-shot mode, and to stop an operation of the correction data acquisition unit while consecutively performing image sensing processing in the sequential mode.

According to the present invention, the foregoing object is also attained by providing a control method of an image sensing apparatus which processes charge signals read from a plurality of image sensing areas of an image sensing device by a plurality of image processing units, respectively, outputs and combines a plurality of processed image signals to generate a combined image signal of a single image, and is capable of operating in at least a single-shot mode and a sequential mode, the method comprising:

acquiring correction data for correcting a difference, resulted from variation in characteristics of the plurality of image processing units, between a plurality of image signals on the basis of a plurality of image signals obtained by reading charge signals from the plurality of image sensing areas of the image sensing device with shielding external light toward the image sensing device and illuminating the image sensing device with a light source, and processing the read charge signals by the plurality of image processing units; and controlling to obtain correction data for each image sensing processing in the single-shot mode, and to stop obtaining correction data while consecutively performing image sensing processing in the sequential mode, wherein the combined image signal of the single image is obtained by combining a plurality of image signals corrected by using the correction data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail below in accordance with the accompanying drawings. In this embodiment, a case where a digital still camera (simply referred to as "digital camera", hereinafter) is used as an image sensing apparatus will be explained.

Figure 1:
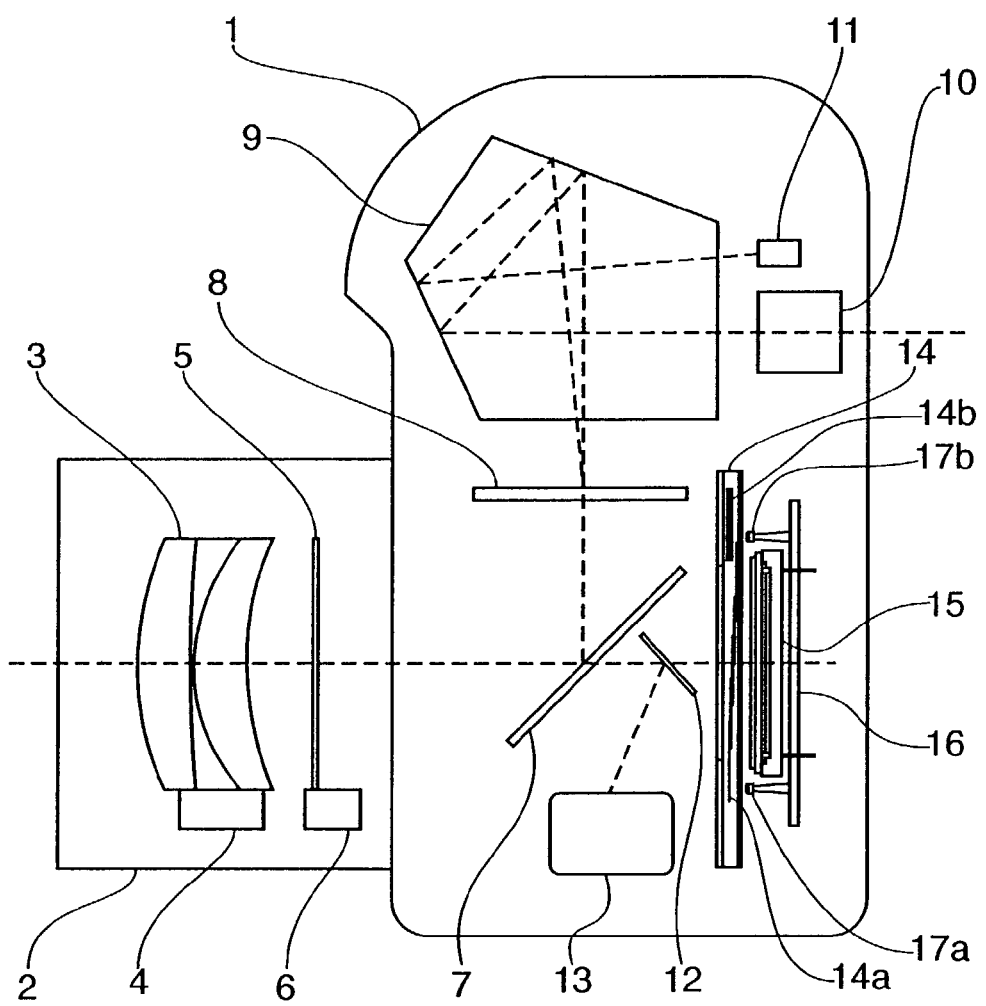
FIG. 1 is a schematic sectional view of an electronic still camera according to an embodiment of the present invention.
Figure 2:
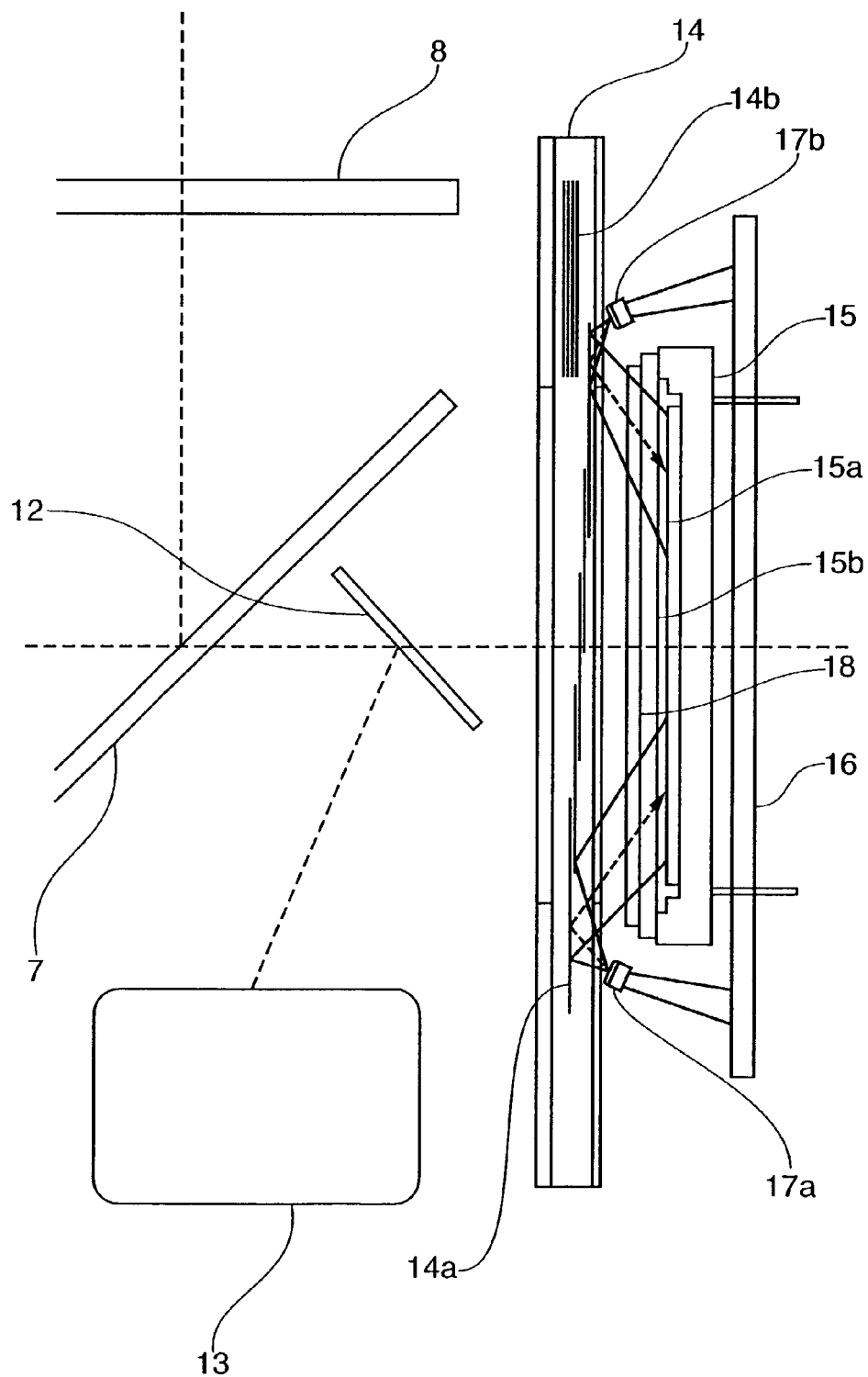
FIG. 2 is a partially enlarged view of the electronic camera shown in FIG. 1.

FIG. 1 is a schematic cross sectional view of the structure of an entire camera viewed from its side, and FIG. 2 is an enlarged view of a shutter apparatus 14 (will be described later) in the camera shown in FIG. 1.

In FIG. 1, reference numeral 1 denotes an electronic still camera, and reference numeral 2 denotes an image sensing lens system 2 that projects an image of an object formed on an image-formation plane, and the lens system 2 is designed detachable from the electronic still camera 1. The lens system 2 has an imaging lens 3 for projecting the image of the object formed on the image-formation plane, a lens driving mechanism 4 for driving the imaging lens 3, aperture blades 5 for performing exposure control, and an aperture driving mechanism 6 for driving the aperture blades 5.

Note, although simplified in the drawing, the lens system 2 has one or more lenses and can be single focus (fixed focus) lens system, or a variable focus lens system, such as a step zoom lens system.

A main mirror 7 directs luminous flux of an image of an object passing through the lens system 2 to a focusing screen 8, and projects a part of the luminous flux of the image penetrated to further directs a part of the luminous flux of the image to a focus detecting unit 13 through a sub mirror 12 (will be described later). The main mirror 7 is movably constituted, by a mirror driving mechanism (not shown), between a position where an image of an object can be observed from a finder and a position outside of the optical path of a luminous flux at the time of image sensing operation.

Reference numeral 8 denotes a focusing screen 8, where the luminous flux of an image of an object projected by the lens system 2 is formed after being reflected by the main mirror 7, and at the time of finder observation, the image of the object is formed on the focusing screen 8. An optical member 9 reflects an image of an object, formed on the focusing screen 8, thereby converting it into a correct image, and in this embodiment, consists of a pentaprism.

An eyepiece unit 10 projects the image of the object, which is reflected and converted into the correct image by the pentaprism 9, reach the user's eye. A photometry unit 11 measures the brightness of the image of the object, formed on the focusing screen 8 through the pentaprism 9 at the time of finder observation. The electronic still camera 1 according to this embodiment is constituted so that an exposure control at the time of exposure may be performed on the basis of an output signal of the photometry unit 11.

A sub mirror 12 reflects the luminous flux of an image of an object penetrated through the main mirror 7, and projects the luminous flux to the focus detecting unit 13 which is arranged on the bottom surface of a mirror box (not shown). The sub mirror 12 is interlocked with the main mirror 7 via a mirror driving mechanism (not shown) of the main mirror 7. The sub mirror 12 is movably constituted so that the sub mirror 12 is moved to the position where the luminous flux is projected to the focus detecting unit 13 when the main mirror 7 is in the position where the user can observe the image of the object through the finder, and to the position outside of an optical path of the luminous flux at the time of image sensing operation.

Reference numeral 13 denotes the focus detecting unit, and the lens driving mechanism 4 of the lens system 2 is controlled on the basis of the output signal of the focus detecting unit 13, and focus control is performed by driving the imaging lens 3. A shutter unit 14 mechanically controls the incidence of the luminous flux of an image of an object on an imaging plane. This shutter unit 14 is a focal plane shutter having front blades 14a and rear blades 14b. The front blades 14a screen the luminous flux at the time of finder observation and move outside of the optical path of the luminous flux in response to a release signal at the time of image sensing operation to start exposure. In addition, the rear blades 14b screen the luminous flux of the image at predetermined timing after the movement of the front blades 14a starts at the time of image sensing operation, while being out of the optical path of the luminous flux at the time of finder observation.

Furthermore, a notch or a through hole for emitting the luminous flux emitted by LED devices 17a and 17b, which are described later, to the front blades 14a is formed near an aperture of the shutter unit 14.

An image sensing device 15 is used for taking the optical image of the object formed by the lens system 2, and converts the optical image of the object into an electrical signal. A well-known two-dimensional type image sensing device is used for the image sensing device 15. There are various types of image sensing devices, such as CCD type, MOS type, and CID type image sensing devices, and any type of image sensing devices can be adopted. It is assumed that, in this embodiment, an interline type CCD image sensor is used having photoelectric conversion elements (photo sensors) arranged in two dimensions, and signal charges accumulated in the respective sensors are outputted through a vertical transfer path and a horizontal transfer path.

Figure 3:
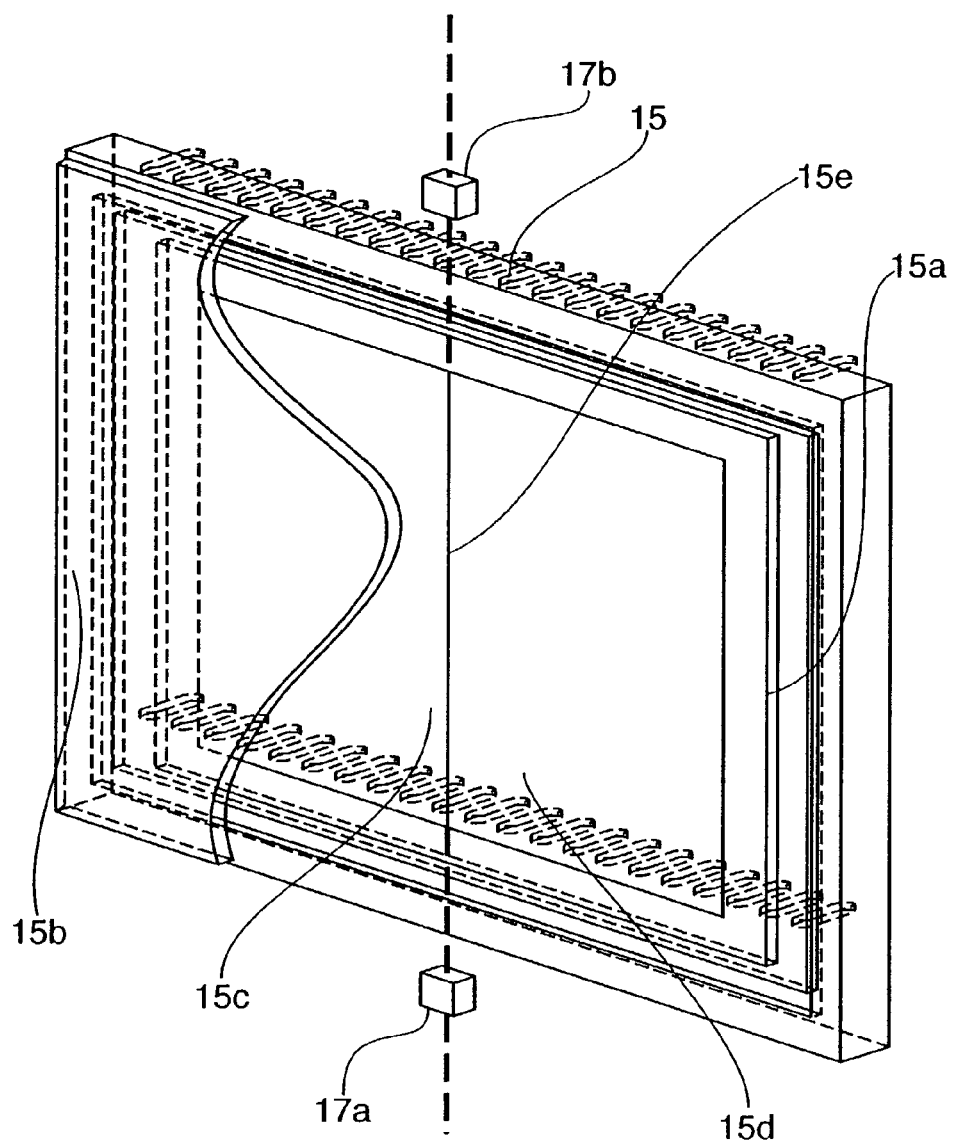
FIG. 3 is a perspective view of an image sensing device and the vicinity thereof according to the embodiment of the present invention.

In addition, the image sensing device 15 has a so-called electronic shutter function which controls accumulation time (shutter time) of the charges accumulated in each sensor. FIG. 3 shows a perspective view of the image sensing device 15. As shown in FIG. 3, a cover glass 15b, an optical protection member that protects the entire image sensing area 15a, protects the image sensing device 15. In addition, the image sensing device 15 is also constituted so that charges accumulated in the image sensing area 15a are separately and concurrently outputted for a right half area 15c and a left half area 15d, and each of the divided areas 15d and 15c is formed of a plurality of pixels, which generate electrical signals in responsive to the incident light, arranged in two dimensions.

An electric substrate 16 electrically and mechanically combines the image sensing device 15, and the LED devices 17a and 17b described later, and supports them. LED devices 17a and 17b emit light to the image sensing area 15a, and comprise the LED devices in the present invention. As shown in FIGS. 2 and 3, the LED devices 17a and 17b are arranged near the upper and lower sides of the image sensing area 15a, and on the extension line of a parting line 15e which divides the image sensing area 15a into the right half area 15c and left half area 15d. At the same time, the LED devices 17a and 17b are arranged so that the LED devices 17a and 17b may emit light with radiation faces of the LED devices 17a and 17b facing to the shutter unit 14.

The luminous flux emitted by the LED devices 17a and 17b is incident on the image sensing area 15a of the image sensing device 15 after being reflected by the front blades 14a of the shutter unit 14, with the surface facing the image sensing device 15 being a reflection surface.

Figure 4:
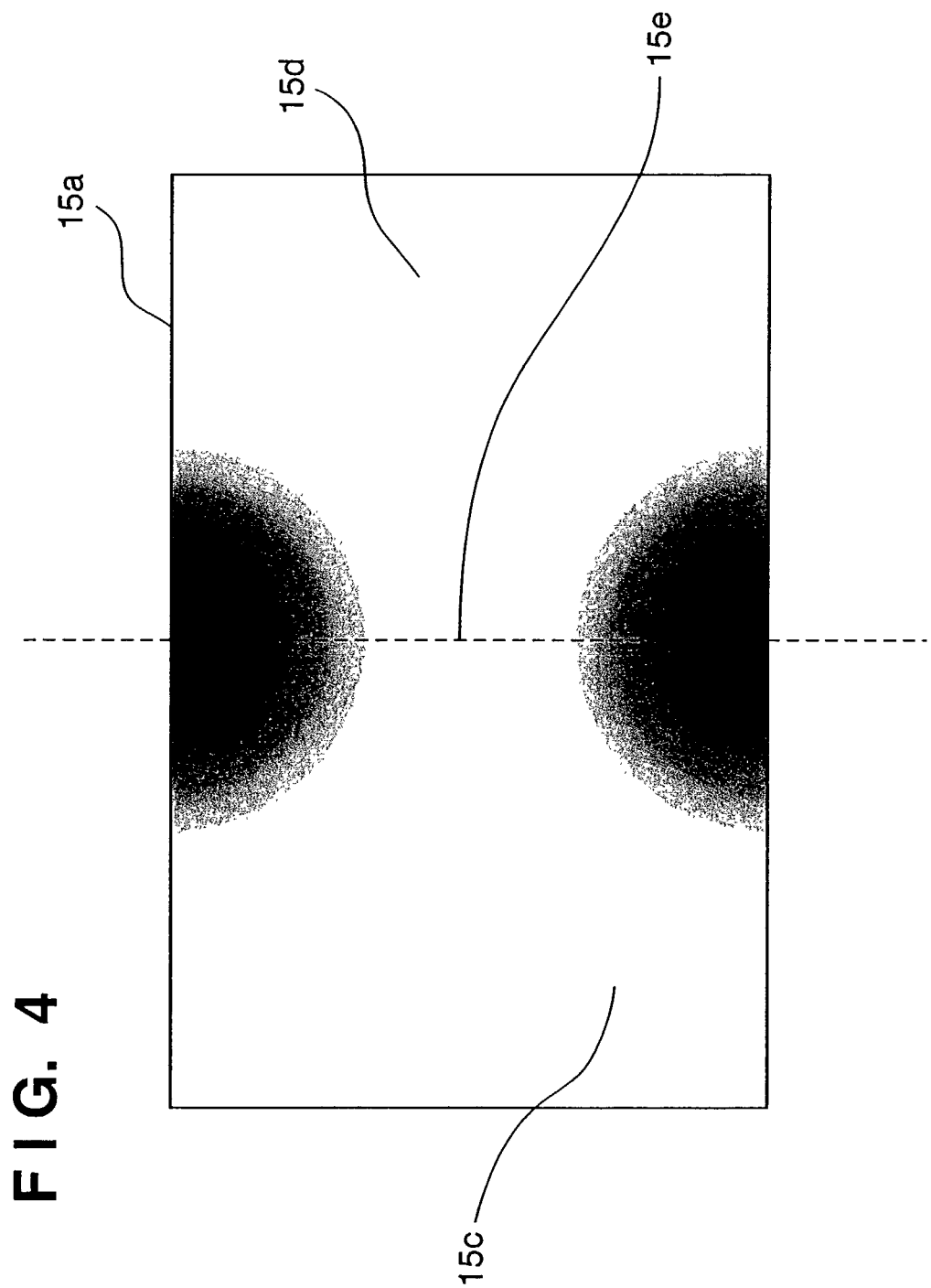
FIG. 4 is a drawing of a lighting status in an image sensing area of the image sensing device by LEDs according to the embodiment of the present invention.

FIG. 4 shows a state of light-emission by the LED devices 17a and 17b onto the image sensing area 15a of the image sensing device 15. As shown in this figure, the luminous flux emitted by the LED devices 17a and 17b is incident on the right half area 15c and left half area 15d of the image sensing area 15a of the image sensing device 15 approximately symmetrically.

Usually, reflective prevention coating is applied for preventing fogging on a film, which is caused by stray light, to a front blade of a shutter unit in a camera which uses a silver halide film as a recording medium. However, an electronic still camera according to this embodiment is constituted so that exposure time control is realized by controlling accumulation time (shutter time) of charges accumulated in the respective sensors by the electronic shutter function of the image sensing device 15. Hence, since the front blades 14a is in an open state at the start of accumulation in the image sensing device 15, the reflective prevention coating on the front blades 14a for preventing fogging on the image sensing area by the stray light becomes unnecessary.

Therefore, in order to efficiently project the luminous flux emitted by the LED devices 17a and 17b to the image sensing area 15a of the image sensing device 15, it is desirable that the front blades 14a of the shutter unit 14 in the electronic still camera 1 according to the embodiment comprises a material with a high reflectance. Alternatively, it is desirable to coat the front blades 14a with a high reflectance paint, plate the front blades 14a, etc. as surface treatment. In addition, in order to illuminate the image sensing area 15a of the image sensing device 15 as broad as possible, it is desirable to give diffusion characteristics to the front blades 14a of the shutter unit 14. The surfaces of the front blades 14a that face the image sensing device 15 are coated with semigloss white tone paint or semigloss gray tone paint in this embodiment in order to achieve the above-described two conditions. However, it is possible to obtain a sufficient lighting effect so long as one of the conditions is fulfilled.

It should be noted that, in this embodiment, the image sensing area 15a is illuminated by the raw luminous flux emitted by the LED devices 17a and 17b. However, a mask member having a predetermined pattern and an optical member for forming this pattern on the image sensing area 15a may be arranged near the radiation faces of the LED devices 17a and 17b, so that light of the predetermined pattern may be incident instead of direct light.

As shown in FIG. 2, in the embodiment, the LED devices 17a and 17b are supported and electrically connected by the electric substrate 16 which is a supporting member of the image sensing device 15. Nevertheless, the supporting members of the LED devices 17a and 17b may be formed on the shutter unit 14, a camera body (not shown), etc., and electrical connection may be realized by connecting the LED devices 17a and 17b to the electric substrate 16 or another circuit board, which is not shown, with a flexible printed circuit board, lead wires, etc.

A filter member 18 removes high frequency components of the image sensing light that causes noise, and is supported integrally on the cover glass 15b of the image sensing device 15. The filter member 18 is made of materials with birefringent characteristics, such as crystal and a lithium niobate.

Figure 5:
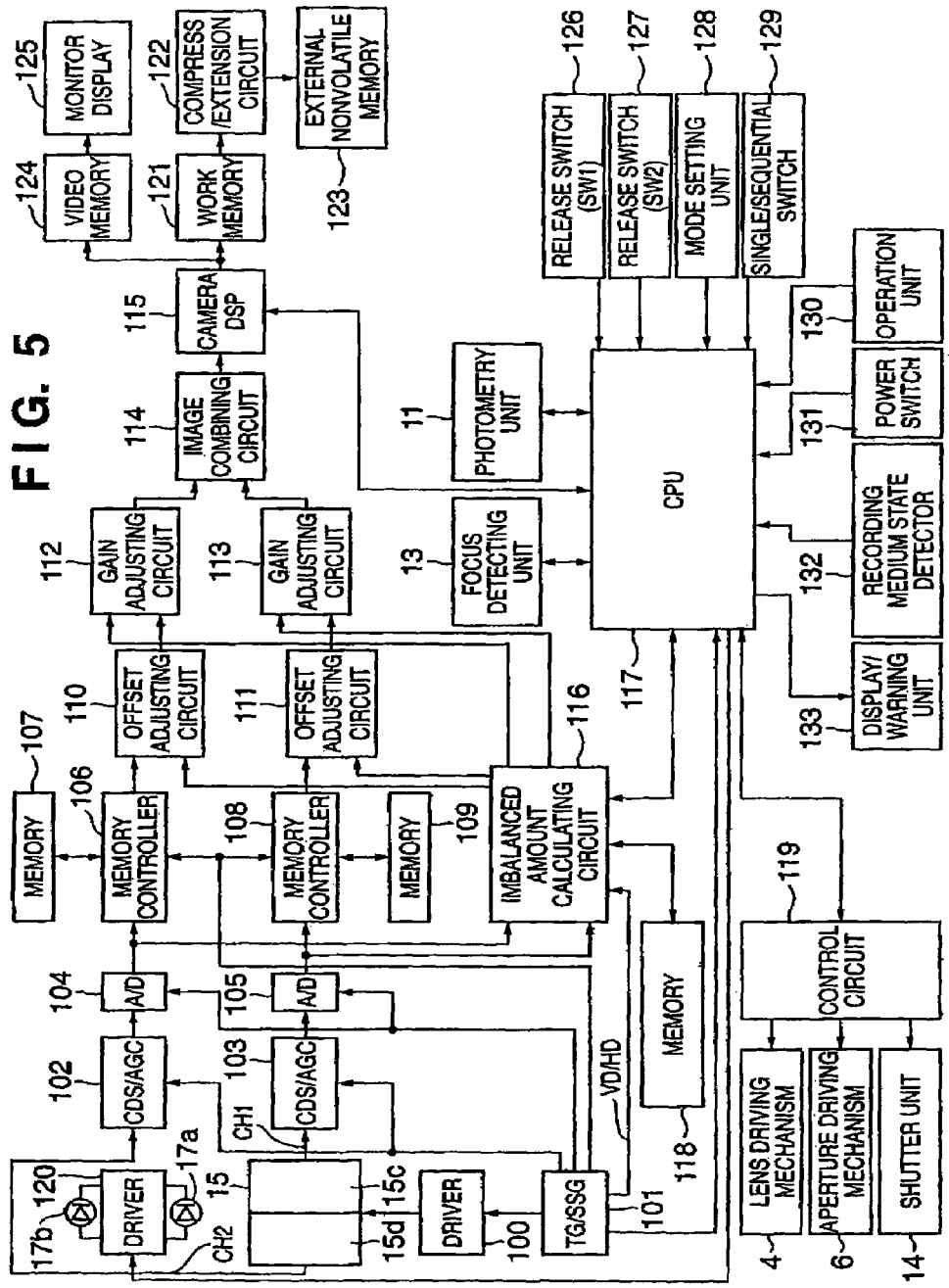
FIG. 5 is a block diagram showing the entire hardware configuration according to the embodiment of the present invention.

FIG. 5 is a block diagram showing the entire hardware structure of the above-described electronic still camera 1 according to the embodiment. The electronic still camera 1 mainly has the lens driving mechanism 4 which drives the lens system 2, the aperture driving mechanism 6, the shutter unit 14, the image sensing device 15, and a processing circuit group which processes an output signal from the image sensing device 15, an imbalanced amount calculating circuit 116, a control circuit 119, a central processing unit (CPU) 117.

Reference numeral 11 denotes the photometry unit 11 for performing an automatic exposure (AE) operation. The light passing through the lens system 2 is incident on the photometry unit 11 via the aperture blades 5, main mirror 7, and photometry lens (not shown), in a single-lens reflex mechanism, and an image formed as an optical image can measure the exposure state.

Reference numeral 13 denotes the focus detecting unit for performing automatic focusing (AF) processing. Reference numerals 100–116, 118, and 120–125 are processing circuits for processing an image signal output from the image sensing device 15.

In the above-described structure, luminous flux of an image of an object that penetrates the lens system 2 is regulated by quantity of light with the aperture blades 5 and shutter unit 14 to be incident on the image sensing device 15. The image sensing device 15 with the two output channels (CH1 and CH2) operates at a predetermined frequency by being driven by a driver 100, and outputs the sensed image data separately in a mode of vertically dividing an entire image into two pieces, that is, right and left half areas (15c, 15d).

In addition, a TG/SSG 101 is a timing generating circuit that outputs a vertical synchronizing signal VD and a horizontal synchronizing signal HD, and simultaneously supplies a timing signal to each circuit block.

Image data (CH1 output) of the right half area 15c of the image sensing device 15 is inputted into a CDS/AGC circuit 103. Then, by performing processing such as a known correlative double sampling etc., the CDS/AGC circuit 103 removes reset noise included in the output from the CCD and the like. Further, the CDS/AGC circuit 103 amplifies the output to a predetermined signal level. A signal AD-CH1 can be obtained after the output signal after this amplification is converted into a digital signal in an A/D conversion circuit 105.

Similarly, image data (CH2 output) of the left half area 15d of the image sensing device 15 is inputted into a CDS/AGC circuit 102. Then, similarly, by performing processing such as a known correlative double sampling etc., the CDS/AGC circuit 102 removes reset noise included in the output from the CCD and the like. Further, the CDS/AGC circuit 102 amplifies the output to a predetermined signal level. A signal AD-CH2 can be obtained after the output signal after this amplification is converted into a digital signal in an A/D conversion circuit 104.

In this way, the both signals AD-CH1 and AD-CH2 that are separately converted into the digital data are sequentially stored in memory 109 and 107 through memory controllers 108 and 106, respectively.

In addition, when the calibration mode described later is set, the signals AD-CH1 and AD-CH2 are simultaneously inputted also into the imbalanced amount calculating circuit 116. Furthermore, imbalanced amounts of the both signals are calculated with a method describing later, and the optimal correction data is simultaneously determined and stored in a memory 118 for correction data.

Since the memory controllers 106 and 108 can usually perform reading and writing from/to memory 107 and 109 continuously in time division, it is possible to write the signals from the image sensing device 15 in the memory 107 and 109, while reading data, written in the memory 107 and 109, at different timing in the order in which the data were written.

First, as for a signal from the CH1 output terminal of the image sensing device 15, data is continuously read from the memory 109 under the control of the memory controller 108, and is inputted into an offset adjusting circuit 111. Here, a predetermined OF1 that is calculated and set in the imbalanced amount calculating circuit 116 is inputted into the other input terminal of the offset adjusting circuit 111, and both signals are added inside the offset adjusting circuit 111.

Next, an output of the offset adjusting circuit 111 is inputted into a gain adjusting circuit 113, and a predetermined gain GN1 which is calculated and set in the imbalanced amount calculating circuit 116 is inputted into the other input terminal of the gain adjusting circuit 113. Then, both signals are multiplied inside the gain adjusting circuit 113.

Similarly, as for a signal from the CH2 output terminal of the image sensing device 15, data is continuously read from the memory 107 under the control of the memory controller 106, and is inputted into an offset adjusting circuit 110. Here, a predetermined offset OF2 that is calculated and set in the imbalanced amount calculating circuit 116 is inputted into the other input terminal of the offset adjusting circuit 110, and both signals are added inside the offset adjusting circuit 116.

Next, an output of the offset adjusting circuit 110 is inputted into a gain adjusting circuit 112, here, a predetermined gain GN2 which is calculated and set in the imbalanced amount calculating circuit 116 is inputted into the other input terminal of the gain adjusting circuit 112, and both signals are multiplied inside the gain adjusting circuit 112.

Thus, the image data output after the imbalanced amount calculating circuit 116 corrects the imbalanced amount produced between two channels is converted into data of a signal image in the image combining circuit 114 (i.e., the right and left images are combined to a single image). Then, predetermined color processing (color interpolation processing, gamma conversion, etc.) is performed in a camera digital signal processor (DSP) 115.

The camera DSP 115 performs a predetermined arithmetic operation using the sensed image data, and performs through-the-lens (TTL) automatic white balance processing on the basis of the arithmetic result. In other words, in accordance with control signals from the CPU 117, image data of one frame is read out from the memory 107 and 109, combined into image data of a single image in the image combining circuit 114. Thereafter, the camera DSP 115 applies image processes on the image data, and stores the processed image data in a work memory 121.

A compression/expansion circuit 122 compresses the data stored in the work memory 121 on the basis of a predetermined compression format, and the compressed data is stored in an external nonvolatile memory 123, which is recording medium. As the external nonvolatile memory 123, a nonvolatile memory such as a flash memory is generally used. The external nonvolatile memory is configured so as to be detachable from the electronic still camera 1, and a recording medium state detector 132 detects whether any nonvolatile memory is attached or not.

Reference numeral 124 denotes a video memory; 125, a monitor display unit comprising a TFT LCD, for instance. The image data written to the video memory 124 from the camera DSP 115 is displayed on the monitor display unit one by one. Further, in observing the recorded image data, the compressed image data which is stored in the external nonvolatile memory 124 is expanded to normal data representing each pixel by the compression/expansion circuit 122, and the expanded data is transferred to the memory 124, then displayed on the monitor display unit 125.

The monitor display unit 125 can be arbitrarily turned on/off in response to a designation by the CPU117. By turning off the monitor display unit 125, consumption of electric power of the electronic still camera 1 can be greatly reduced.

As described above, in a normal image sensing operation, output from the image sensing device 15 is converted to image data via various processing circuits, and stored in the work memory 121 or the video memory 124 at almost real time.

Next, described is the control, in the calibration mode, which is needed at the time of combining the right and left images for computing the correction amount by the imbalanced amount calculating circuit 116 according to the embodiment.

In the state where a user sets the calibration mode with the mode setting unit 128 and the CPU 117 detects the state set in the mode setting unit 128, the CPU 117 instruct the imbalanced amount calculating circuit 116 to start calibration while directing the driver 120 to turn on the LED devices 17a and 17b for calibration for a predetermined period.

The LED devices 17a and 17b emit light to the image sensing device 15 under control of the driver 120. The image sensing device 15 starts accumulation of an image (FIG. 4) of the illumination light according to the lighting period of the LED devices 17a and 17b. Then, the image sensing device 15 outputs image signals to the CDS/AGC circuits 103 and 102 through the output terminals CH1 and CH2, and the output signal is processed as described above.

In addition, the imbalanced amount calculating circuit 116 computes the imbalanced amount of the image (FIG. 4) of the illumination light emitted by the LED devices 17a and 17b with a below-described method, and determines an adequate correction amount. Furthermore, the imbalanced amount, correction amount, etc. that are computed are stored in the memory 118 connected to the imbalanced amount calculating circuit 116.

The camera 1 has a structure to notify a user, using a display/warning unit 133, that adequate calibration cannot be performed, if it is determined that there is apparent abnormality in the image outputted from the image sensing device 15 at this time, for example, if no signal is obtained from a portion currently illuminated by the light emitted by the LED devices 17a and 17b. Therefore, in consequence, the user can recognize certain abnormalities (a failure of the image sensing device, signal processing circuit, LED, or the like) of the camera.

Next, the specific structure and operation of the imbalanced amount calculating circuit 116 will be described with reference to FIG. 6.

Figure 6:
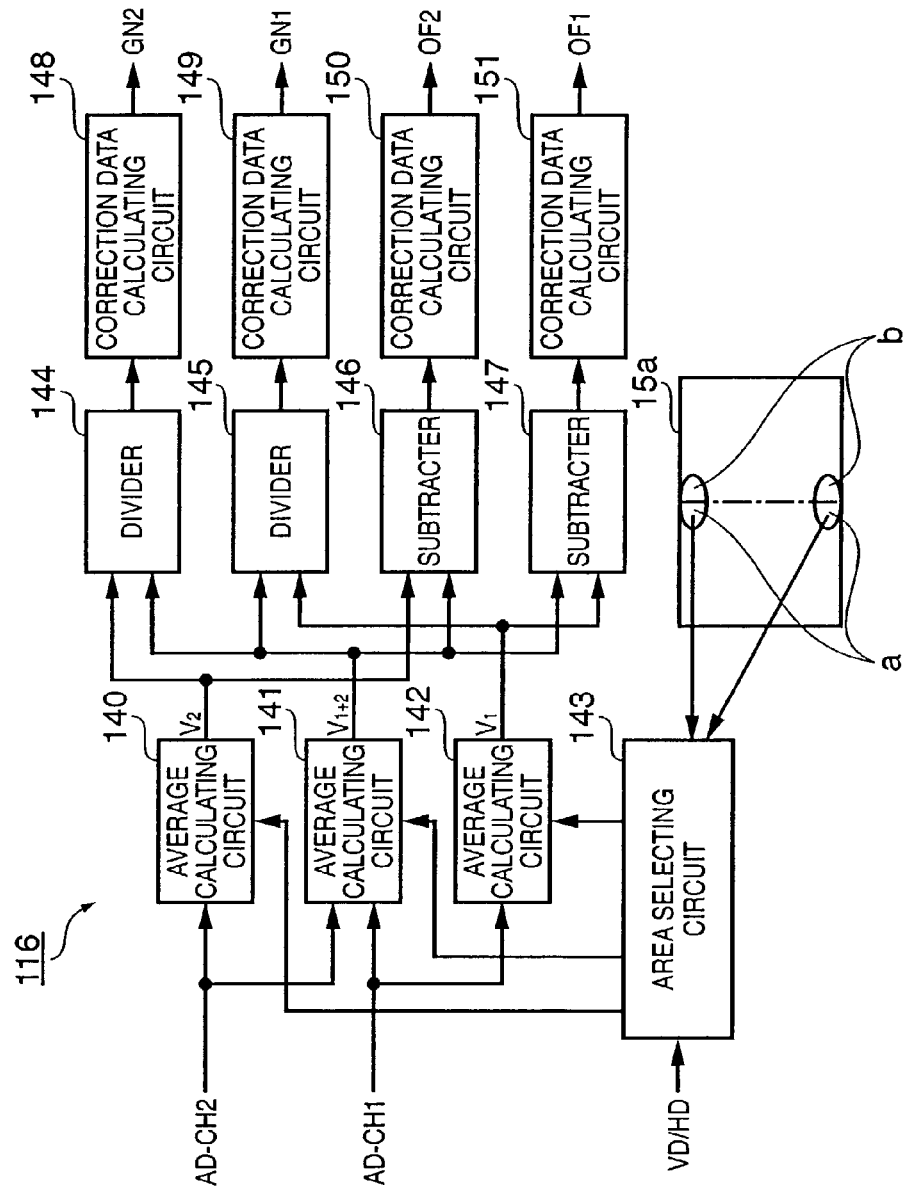
FIG. 6 is a block diagram showing the structure of an imbalanced amount calculating circuit according to the embodiment of the present invention.

FIG. 6 is a block diagram showing a configuration of the imbalanced amount calculating circuit 116. In FIG. 6, first, signals AD-CH1 and AD-CH2 which are obtained by turning on the LED devices 17a and 17b and are the outputs of the A/D conversion circuits 105 and 104 are inputted into average calculating circuits 140, 141, and 142. Here, the pixel data is averaged over a predetermined range by these averaging circuits 140 to 142. An area selecting circuit 143 sets the predetermined range.

The area selecting circuit 143 determines pixel data, outputted from the image sensing device 15, within an effective range on the basis of the VD/HD signals from the TG/SSG 101 shown in FIG. 5, and sets the timing to permit inputting of pixel data used for averaging in respective average calculating circuits 140 to 142. For example, the average calculating circuit 140 computes an average of the data of pixels within an illuminated area a by the LED devices 17a and 17b that is shown in the image sensing area 15a of the image sensing device 15. Further, the average calculating circuit 142 computes an average of the data of pixels within an illuminated area b by the LED devices 17a and 17b that is shown in the image sensing area 15a of the image sensing device 15. The average calculating circuit 141 computes the average of data of pixels within both of the illuminated areas a and b by the LED devices 17a and 17b shown in the image sensing area 15a of an image sensing device 15.

Therefore, in this case, the average calculating circuits 140, 142, and 141 respectively calculate an average of pixel data of a predetermined range which exists in the left half area 15d of the image sensing device 15, an average of pixel data of a predetermined range which exists in the right half area 15c of the image sensing device 15, and an average of pixel data of a predetermined range which exists both in the right and left half areas of the image sensing device 15, respectively.

Next, let respective outputs of average calculating circuits 140, 141, and 142 be defined as $V_2$, $V_{1+2}$, and $V_1$. Dividers 144 and 145 connected to the average calculating circuits 140, 141, and 142 perform division using the respective outputs. First, the divider 144 performs the operation of $V_{1+2}/V_2$, and outputs a value substantially proportional to the quotient as a GN2 signal from a correction data calculating circuit 148. Similarly, the divider 145 performs the operation of $V_{1+2}/V_1$, and outputs a value substantially proportional to the quotient as a GN1 signal from a correction data calculating circuit 149. The GN1 and GN2 signals computed by the above-described method are inputted into the gain adjusting circuits 113 and 112 shown in FIG. 5 respectively, and here, correction is performed so that output levels from both channels may match each other.

Meanwhile, subtracters 146 and 147 also connected to the average calculating circuits 140, 141, and 142 perform subtraction using respective outputs of the average calculating circuits 140, 141, and 142. First, the subtracter 146 performs the operation of $V_{1+2}-V_2$, and outputs a value substantially proportional to the difference as an OF2 signal from a correction data calculating circuit 150. Similarly, the subtracter 147 performs the operation of $V_{1+2}-V_1$, and outputs a value substantially proportional to the difference as an OF1 signal from a correction calculating circuit 151. The OF1 and OF2 signals computed by the above-described method are inputted into the offset adjusting circuits 111 and 110 shown in FIG. 5 respectively, and, correction is performed so that output levels from both channels match each other.

The output signals GN1, GN2, OF1, and OF2 relating to the imbalanced amounts computed with the above-described method are stored in the memory 118 connected to the imbalanced amount calculating circuit 116.

Note, the method of correcting imbalance by using the above-described two kinds of signals relating to imbalanced amounts (a ratio and difference) is for correcting the imbalance between two output channels of the image sensing device 15 by using respective values of an average of pixel data in a predetermined range which exists in the left half area 15d, an average of pixel data in a predetermined range which exists in the right half area 15c, and an average of pixel data in a predetermined range which exists in both the left half area 15d and right half area 15c, among pixel data outputted from the image sensing device 15.

Namely, the above-described method performs both of the two kinds of correction, that is, gain adjustment and offset adjustment to the data output via two channels. However, the present invention is not restricted to this, and either one of these adjustment may be selected to perform imbalance adjustment.

The CPU 117 acts as a system controller which entirely controls the electronic still camera 1. The CPU 117 is connected with the photometry unit 11, focus detecting unit 13, control circuit 119, imbalanced amount calculating circuit 116, driver 120 which drives the LED device 17a and 17b, a release switch (SW1) 126, a release switch (SW2) 127, an image sensing mode setting unit 128, single/sequential switch, an operation unit 130, a power switch 131, the recording medium state detector 132, a display/warning unit 133, and so on. The CPU 117 performs various calculation for obtaining values such as an exposure value and a focal position of the lens system 2 according to predetermined algorithm, and totally manages automatic exposure control, auto-focusing, auto flash, etc.

The control circuit 119 operates the lens driver 4 of the lens system 2 on the basis of the automatic focusing information output from the CPU 117 so as to place the imaging lens 3 to a focusing position. Further, the control circuit 119 operates the aperture unit 6 of the lens system 2 on the basis of the exposure control information so as to set the aperture blades 5 to a set aperture value, then controls open/close timings of the shutter unit 14.

The release switches 126, 127, the mode setting unit 128, the single/sequential switch 129, the operation unit 130, and the power switch 131 constitute operation circuits for instructing various operation to the CPU 117. The operation circuits comprise a single or plurality of combinations of switches, dials, touch panels, a device for pointing by line-of-sight detection, a voice recognition device, and the like.

The release switch (SW1) 126 turns ON by half stroke of a shutter button (not shown), to instruct start of pre-processing such as the operations of the AF processing, the AE processing, the AWB processing, the EF processing. In this embodiment, start of calibration of the image sensing device 15 is also instructed by the release switch 126.

The release switch (SW2) 127 turns ON by full stroke of the shutter button (not shown), to instruct start of a series of operations of exposure processing. In this embodiment, the end of calibration of the image sensing device 15 is also instructed by the release switch 127.

The mode setting unit 128 is configured as a mode dial switch, for instance, and switches and sets one of various image sensing modes such as an automatic image sensing mode, program image sensing mode, shutter speed priory image sensing mode, exposure value priory image sensing mode, manual image sensing mode, focal depth priory mode, portrait image sensing mode, landscape image sensing mode, close-up image sensing mode, sport image sensing mode, night image sensing mode, and panoramic image sensing mode.

The single/sequential switch 129 switches between a single-shot mode in which after a frame of image is recorded by pressing the release switch (SW2) 127, the camera 1 moves to a stand-by state, and a sequential mode in which images are consecutively recorded while the release switch (SW2) 27 is pressed.

The operation unit 130 comprising various buttons and touch panels including a menu button, a set button, a macro button, a multi-image reproduction/repaging button, a flash set button, a single/sequential/self-timer image sensing selection button, a forward (+) menu item selection button, a backward (−) menu item selection button, a forward (+)

reproduction image search button, a backward (−) reproduction image search button, an image sensing quality selection button, an exposure compensation button, an ISO set button, and a date/time set button.

The operation unit 130 further comprises a selection/switch button for selecting and switching between the various functions upon performing image sensing and reproduction operations in, e.g., a panoramic mode, a set/return button for setting the various functions upon performing image sensing and reproduction operations in, e.g., a panoramic mode, an ON/OFF switch for setting ON/OFF of the monitor display unit 125, a quick review ON/OFF switch for setting a quick review function for automatically reproducing the sensed image data right after the image sensing operation, and a compression mode switch for selecting a compression ratio of JPEG compression, or selecting a CCD RAW mode for recording signals obtained from the image sensing device 15 after digitized without being compressed.

Furthermore, the operation unit 130 includes a reproduction switch for setting various function modes, such as a reproduction mode, a multi-image reproduction/delete mode, a PC connection mode, and an AF mode setting switch for setting a one-shot AF mode in which auto focusing operation starts in response to compression of the release switch (SW1) 126 and after the focused state is reached, the state is kept, and a therbo AF mode in which auto focusing operation is continuously performed while the release switch (SW1) 126 is pressed. Note, a dial switch may be used for a plus button and minus button, which may improve operability of selecting numbers and functions.

The power switch 131 switches between the power-on mode and power-off mode of the electronic digital still camera 1. The recording medium state detector 132 detects whether or not the nonvolatile memory 123 as a recording medium is attached to the camera 1.

The display/warning unit 133 comprises one or more combinations of liquid crystal display devices and speakers for notifying operating statuses, messages, warnings, and the like, using characters, images, sound and the like, in correspondence with execution of program by the CPU 117. Especially, the display device or devices is/are provided in a single or plural visually-recognizable positions around an operation unit 130 of the camera 1. For example, the display/warning unit 133 is configured with LCD, LED, sound generating element, and the like. Further, a part of functions of the display/warning unit 133 is provided within an optical finder (not shown).

The display contents of the display/warning unit 133, displayed on the LCD or the like, include indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of nonvolatile memory 123 as a recording medium, operation of communication, date and time, and a connection state with an external computer.

Further, the display contents of the display/warning unit 133, displayed within the optical finder (not shown), include a focus state, completion of preparation for an image sensing operation, a camera shake warning, a flash charge state, completion of flash charging, the shutter speed, the f number (aperture), the exposure compensation, and a recording medium write operation.

Further, the display contents of the display/warning unit 133, displayed on an LED or the like, include a focus state, completion of preparation for an image sensing operation, a camera shake warning, a flash charge state, completion of flash charging, a recording medium write operation, a notification for setting a macro image sensing operation, and a charged state of a secondary battery.

Further, the display contents of the display/warning unit 133, displayed on a lamp or the like, include a self-timer set state. The lamp for notifying the self-timer set state may share the light source for AF compensation.

Figure 7:
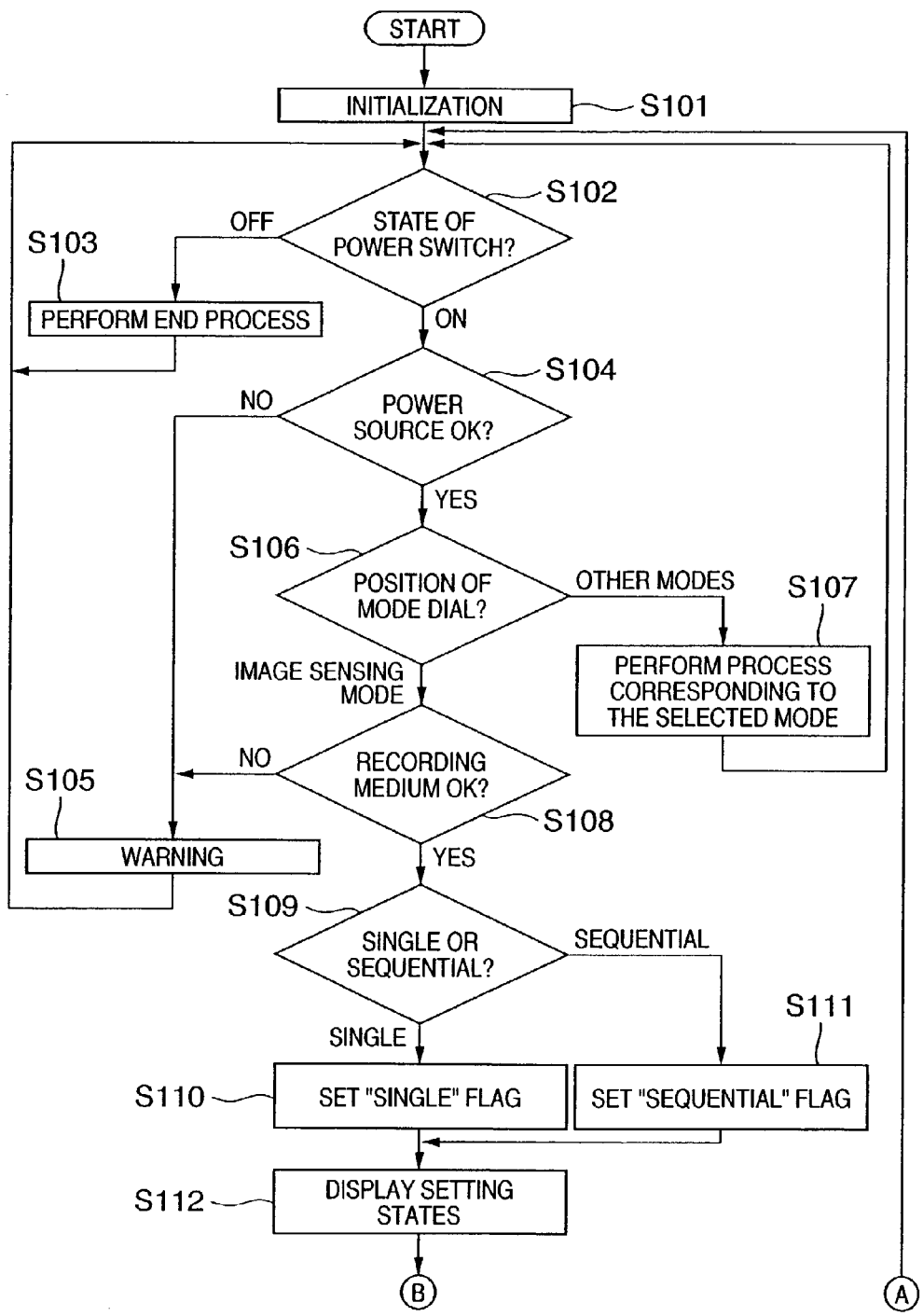
FIG. 7 is a flowchart showing a processing sequence of an image sensing operation of the electronic still camera.
Figure 8:
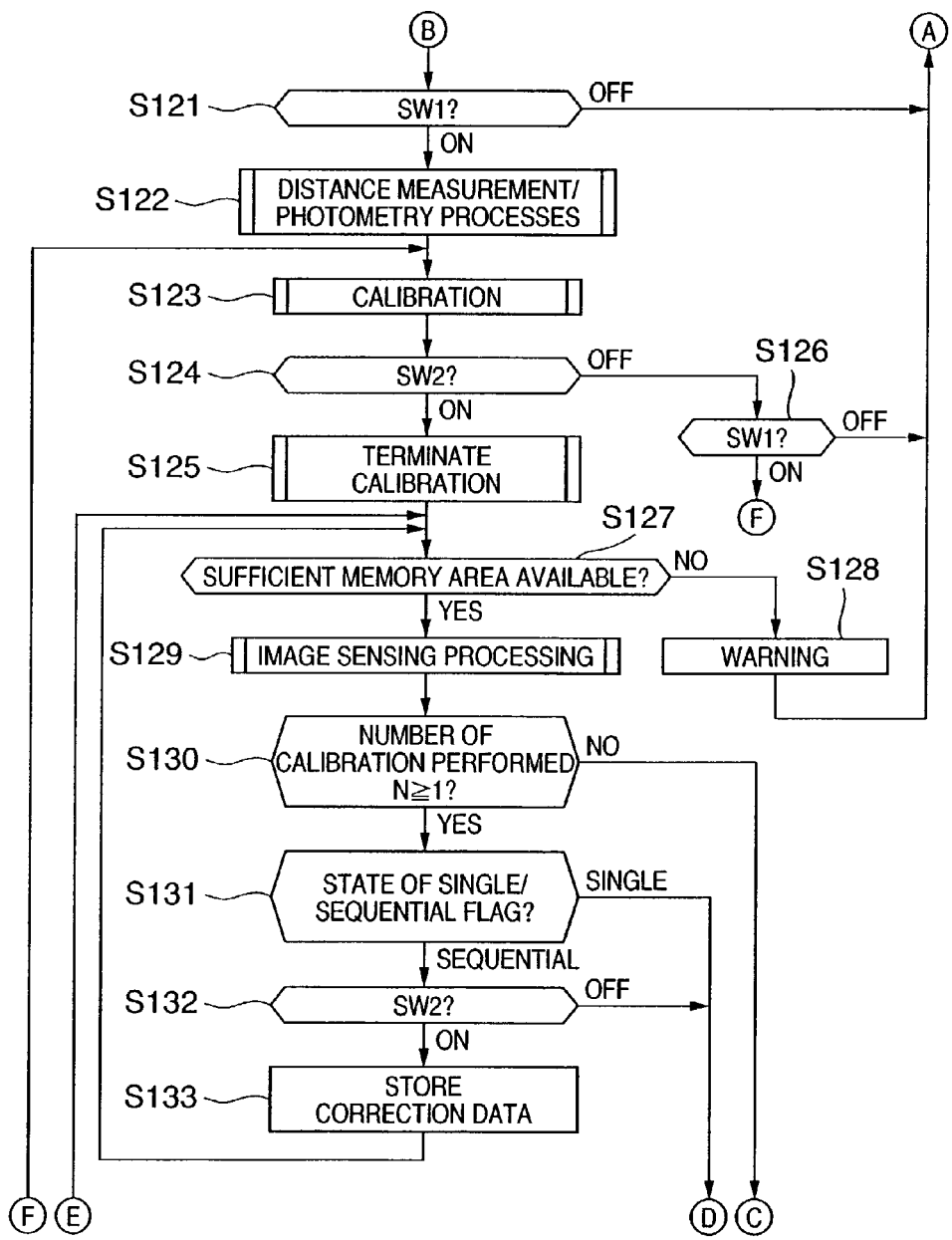
FIG. 8 is a flowchart showing the processing sequence of the image sensing operation of the electronic still camera.
Figure 9:
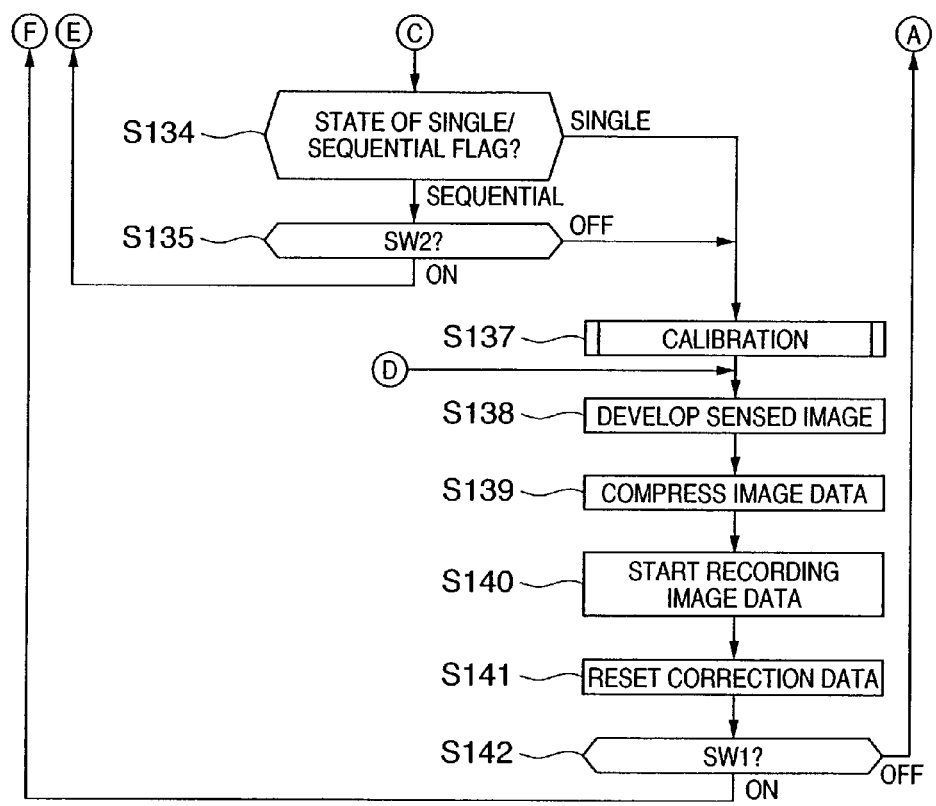
FIG. 9 is a flowchart showing the processing sequence of the image sensing operation of the electronic still camera.

Next, an operation of the electronic digital still camera 1 having the aforesaid configuration will be explained. FIGS. 7, 8 and 9 are flowcharts showing processing a procedure of image sensing operation of the electronic digital still camera 1. This processing program is stored in a ROM (not shown) in the CPU 117, and executed by the CPU 117.

In response to turning on of the camera 1 by, e.g., exchanging batteries, the CPU 117 initializes flags and control variables and performs other necessary initialization in each unit of the camera 1 (step S101). In step S102, the CPU 117 detects the state of the power switch 131. If the power switch 131 is set off, then the display of each display unit is changed to the off state, necessary parameters including the flags and control variables, set values, set modes are stored in a nonvolatile memory (not shown) in the CPU 117. Thereafter, an end process such as terminating power supply to unnecessary units of the camera 1 is performed (step S103). Then, the process returns to step S102.

Whereas, if the power switch 131 is set on in step S102, then the CPU 117 determines whether or not the remaining power of a power source including battery may cause any trouble in operating the camera 1 (step S104). If any trouble is predicted, then a predetermined warning message is notified to a user using the display/warning unit 133 using images and sound (step S105). Thereafter, the process returns to step S102.

Whereas, if YES in step S104, the CPU 117 determines the set position of the mode dial as the mode setting unit 128 (step S106). If the mode dial is set to an image sensing mode, then the process proceeds to step S108. Whereas, if the mode dial is set to another mode, the CPU 117 performs a process corresponding to a selected mode (step S107), then the process returns to step S102.

If the mode dial is set to an image sensing mode, the CPU 117 determines whether or not the nonvolatile memory 123 as a recording medium is attached (step S108). Further, in step S108, it is also determined whether or not there is any problem in obtaining management information of image data recorded on the nonvolatile memory 123 or whether or not the operating state of the nonvolatile memory 123 may cause any trouble to recording/reproduction operation of image data on/from the recording medium.

If it is determined that a trouble may be caused, then a predetermined warning message is notified to a user using the display/warning unit 133 using images and sound (step S105). Thereafter, the process returns to step S102. Whereas, if the nonvolatile memory 123 is attached, and no trouble is predicted, the CPU 117 checks a state of the single/sequential switch 129 for selectively setting an single-shot mode and a sequential mode (step S109).

If the single-shot mode is selected, then a single/sequential flag is set to "single" (step S110). Whereas, if the sequential mode is selected, then the single/sequential flag is set to "sequential" (step S111). The state of the single/sequential flag is stored in an internal memory of the CPU 117.

After the single/sequential flag is set, the CPU 117 controls to display various setting states of the camera 1 using the display/warning unit 133 (step S112). If the display of the monitor display unit 125 is ON, then the various setting states of the camera 1 are also displayed on the monitor display unit 125.

Thereafter, whether or not the release switch (SW1) 126 is pressed is determined (step S121). If not, the process returns to step S102. If yes, the CPU 117 performs distance measurement and photometry processes (step S122) In the distance measurement and photometry processes, first the distance to an object is measured and the camera 1 focuses to the object by moving the lens system 2. Then, the photometry is performed and an f value (aperture) and shutter speed are determined. Thereafter, the process moves to step S123. Note, in the photometry process, a flash is set in accordance with necessity. The distance measurement and photometry processes will be described later in detail.

In addition to the distance measurement and photometry processes, the CPU 117 initiates calibration in response to the compression of the release switch (SW1) 126 (step S123). In this calibration, the imbalanced amounts for the both right and left image data simultaneously outputted from the respective output terminals of the right and left half area 15*c* and 15*d* are precisely detected, and calculates correction data.

As described above, after performing distance measurement and photometry processes, and calibration in response to the compression of the release switch (SW1) 126, whether or not the release switch (SW2) 127 is pressed is detected. In this manner, it is possible to reduce the release time lag.

In the calibration process in step S123, the imbalanced amounts are calculated using the obtained calibration data, then the correction data is calculated. Accordingly, when right and left image data from the image sensing device 15 is combined to image data of a single image in the image combining circuit 114, the obtained image data can be corrected properly. The details of the calibration process will be described later.

Thereafter, whether or not the release switch (SW2) 127 is processed is determined (step S124). If not, the calibration process in step S123 is repeated until the release switch (SW1) 126 is released (i.e., until OFF in step S126).

As described above, by repeating the calibration process at a predetermined interval, more correction data is accumulated, and thus reliability of the correction data improves. Accordingly, the precision of the correction at the time of combining the right and left image data is greatly improved.

Whereas, when the release switch (SW1) 126 is released in step S126, the process returns to step S102.

Further, if the release switch (SW2) 127 is pressed in step S124, the CPU 117 terminates the calibration process regardless of the state of the calibration process (namely, whether or not calculations of the imbalanced amounts and the correction data are finished) (step S125).

As described above, by forcibly terminating the calibration in response to the compression of the release switch (SW2) 127, it is possible to reduce release time lag when the release switch (SW2) 127 is pressed.

Next, whether or not there is a sufficient buffer memory area capable of storing the sensed image data in the memories 107 and 109 (step S127). If there is not, a predetermined warning message is notified to a user using the display/warning unit 133 (step S128). Thereafter, the process returns to step S102.

A situation in which there is not a buffer memory area capable of storing new image data includes a case where, right after a maximum number of images capable of being stored in a buffer memory area of the memories 107 and 109 are sensed consecutively, image data is read from the memories 107 and 109 and processed, but the first image to be written on the nonvolatile memory 123 has not been recorded on the nonvolatile memory yet, and an area for storing even a single image is not secured in the buffer area of the memories 107 and 109, yet.

Note, in a case of storing the sensed image data after being compressed in the buffer area of the work memory 121, whether or not there is an available buffer area in the work memory 121 in consideration of difference in amount of image data before and after the compression in dependence upon a set compression mode.

Whereas, if there is a buffer area available for storing the sensed image data in the memories 107 and 109, the CPU 117 performs image sensing processing in which the CPU 117 reads image signals obtained by exposing the image sensing device 15 for a predetermined period from the image sensing device 15, performs aforesaid image processes, then stores the processed image data in a predetermined area of the memories 107 and 109 (step S129). The details of the image sensing processing will be described later.

After the image sensing processing, the CPU 117 determines whether or not calibration is performed at least one time before the release switch (SW2) 127 is compressed (step S130).

As described above, the camera 1 of the embodiment terminates the calibration process in response to compression of the release switch (SW2) 127 even when the calibration process is in progress.

Therefore, in step S130, whether or not the image sensing processing is performed before the imbalanced amounts and correction data for the sensed image data are calculated in calibration process is determined. if the calibration process has been performed at least once, imbalanced amounts and correction data for the sensed image data have been calculated, and the imbalanced amounts and correction data have been stored in the memory 118, the process proceeds to step S131.

In step S131, the state of the single/sequential flag stored in the internal memory of the CPU 117 is determined. If the single/sequential flag is set to "sequential", whether or not the release switch (SW2) 127 is pressed is determined (step S132). If yes, then the CPU 117 determines that the camera 1 is in a sequential image sensing operation, and stores the imbalanced amounts and correction data calculated in the calibration process in the memory 118 via the imbalanced amount calculating circuit 125 (step S133). Thereafter, memories 107 and 109 are checked again in the step S127, and a next frame of image is sensed.

Thus, if yes in step S130 and the single/sequential flag is set to "sequential" in step S131, an image sensing processing of the next frame of image is performed right after one image is sensed without performing calibration process for each frame, which regulates the interval between image sensing processing for sequential images.

Whereas, if the single/sequential flag is set to "single" in step S131 or the release switch (SW2) 127 is not pressed in step S132, then the CPU 117 determines that the sequential image sensing operation is stopped, and starts developing the sensed images (step S138).

Further, after the image sensing processing has performed in step S129, if it is determined in step S130 that the calibration process has not performed even once, since neither imbalanced amount nor correction data for the sensed image data has been calculated or stored in the memory 118, the CPU 117 checks the state of the single/sequential flag stored in the internal memory of the CPU 117 (step S134).

If the single/sequential flag is set to "sequential", then whether or not the release switch (SW2) 127 is pressed is determined (step S135). In a case where the release switch (SW2) 127 is pressed, the CPU 117 recognizes that a sequential image sensing operation is in progress, and checks the memories 107 and 109 again, then performs the image sensing processing of the next frame in step S129.

As described above, if it is determined in step S130 that the calibration process has not been finished and neither imbalanced amounts nor correction data has been calculated and stored, the calibration process of step S123 is not performed for each frame and repeats image sensing processing when the sequential mode is set. Accordingly, the interval between image sensing processing becomes substantially constant in sequential image sensing operation.

Whereas, if "single" is set in step S134, then the calibration process is performed in step S137, imbalanced amounts and correction data for the sensed image data are calculated and stored in the memory 118. Thereafter, developing of the sensed image starts in step S138.

Further, if the release switch (SW2) 127 is not pressed in step S135, then the CPU 117 determines that the sequential image sensing operation is stopped. Thus, the calibration process is performed in step S137, the imbalanced amounts and correction data for the sensed image data are calculated and stored in the memory 118. Thereafter, developing of the sensed images starts in step S138.

As described above, if the imbalanced amounts and correction data in the calibration process had not been obtained before starting image sensing processing, the calibration process is performed again in step S137 and the imbalanced amounts and correction data are calculated and stored after the image sensing processing is finished in the single-shot mode or after a series of image sensing processings have finished in the sequential mode. In this manner, it is possible to properly correct the sensed image data. Note that the details of the calibration process will be described later.

In the developing process in step S138, the CPU 117 controls the imbalanced amount calculating circuit 116 and read out correction data, from the memory 118, necessary for combining the images.

Further, the CPU 117 controls the memory controllers 106 and 108 to read out the sensed image data stored in the predetermined area of the memories 107 and 109, and controls the offset adjusting circuits 110 and 111 and the gain adjusting circuits 112 and 113 to correct the image data using the correction data (OF1, OF2, GN1, and GN2) read from the memory 118 and outputted from the imbalanced amount calculating unit 116. Thereafter, the image combining circuit 114 combines the corrected image data. The combined image data is inputted to the camera DSP 115 where various developing processes including AWB process, γ conversion, and color conversion are applied to the combined image data.

The CPU 117 reads out image data stored in a predetermined area of the work memory 121 by the camera DSP 115, controls the compression/expansion circuit 122 to perform image compression corresponding to a set mode on the image data (step S139). The compressed image data is stored in a blank buffer area of the work memory 121.

After the aforesaid series of image processing, recording of the image data starts (step S140). In the recording, the image data stored in the buffer area of the work memory 121 is read out and written to the nonvolatile memory 123, such as a memory card and compact flash® card.

The recording process is performed on image data each time new image data which is sensed and undergone a series of processes is written to an empty buffer area of the work memory 121. Note, while image data is written to the nonvolatile memory 123, the display/warning unit 133 may perform an operation, such as to turn an LED on and off, to notify the user of writing operation being carried out.

Thereafter, the correction data used in the image processing in step S138 is not needed anymore, and the CPU 117 resets the correction data (step S141). In resetting the correction data, the CPU 117 controls the imbalanced amount calculating circuit 116 to delete the correction data stored in the memory 118, or cancel the correction data (OF1, OF2, GN1 and GN2) outputted from the imbalanced amount calculating circuit 116.

In order to prepare for the next image sensing processing, the CPU 117 determines whether or not the release switch (SW1) 126 is pressed (step S142). If the release switch (SW1) 126 is not pressed, the process returns to step S102. Whereas, if the release switch (SW1) 126 is pressed, the calibration process is started in step S123 for the next image sensing processing, then, the next image sensing processing may be performed.

Figure 10:
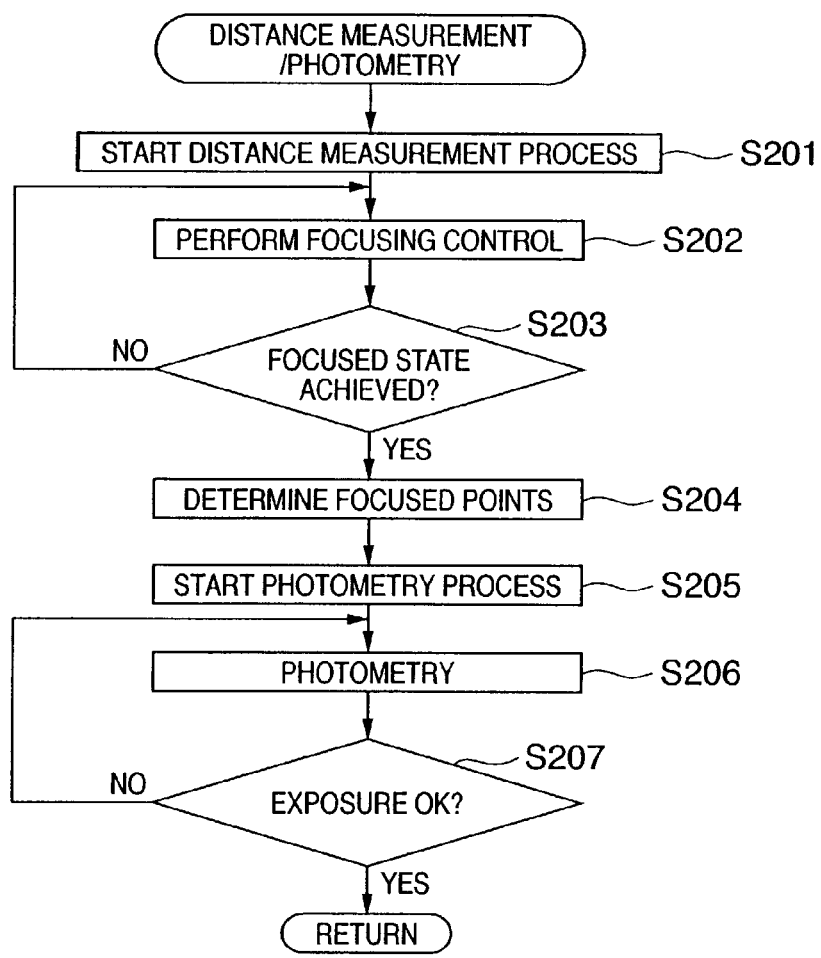
FIG. 10 is a flowchart showing a sequence of distance measurement and photometry processes performed in step S122 of FIG. 8.

FIG. 10 is a flowchart showing a sequence of distance measurement and photometry processes performed in step S122. In the distance measurement and photometry processes, the CPU 117 outputs a control signal to the control circuit 119 in accordance with the focus detecting unit 13 and the photometry unit 11. In turn, the control circuit 119 controls the lens driving mechanism 4, the aperture driving mechanism 6, and the shutter unit 14.

The CPU 117 starts an AF process using the focus detecting unit 13 (step S201). In this AF process, the CPU 117 causes incoming light through the lens system 2 to be incident on the focus detecting mechanism 13 via the aperture blades 5, the main mirror 7 and the sub mirror 12, thereby the focus detecting unit 13 determines the focus state of a formed image as an optical image.

Then, the AF process of detecting the focus state by the focus detecting unit 13 is performed while moving the imaging lens 3 of the lens system 2 by the lens driving mechanism 4 (step S202), and whether or not a focused state is achieved as a result of AF process is determined (step S203). If NO, then the process returns to step S202.

Whereas if YES, the CPU 117 determines the focused point/points within a plurality of distance measurement points in a frame, and stores the determined focused point data and the distance measurement data and/or setting parameters in the internal memory of the CPU 117 (step S204).

Next, the CPU 117 starts an AE process using the photometry unit 11 (step S205), and photometry is performed (step S206). In the photometry process, the CPU 117 causes the incoming light through the imaging lens 3 to be incident on the focusing screen 8 via the aperture blades 5 and the main mirror 7 to form an image of an object. Further, a part of the light is incident on the photometry unit 11 via the pentaprism 9 and a photometry lens. In this manner, luminance of the image of the object formed as an optical image under a current exposure state is measured.

After that, whether or not the exposure is proper is determined (step S207). If not, the process returns to step S206 and the aforesaid process is repeated. Whereas, if the exposure is proper, the CPU 117 stores the photometry data and/or setting parameters in the internal memory of the CPU 117, and the process is completed.

The CPU 117 determines an F value (Av value) and shutter speed (Tv value) in accordance with the result of the photometry obtained in step S206 and an image sensing mode set by the mode dial of the mode setting unit 128. Further, the CPU 117 also determines an accumulation period of charge in the image sensing device 15 on the basis of the determined shutter speed (Tv value), and performs image sensing operation using the determined accumulation period.

Figure 11:
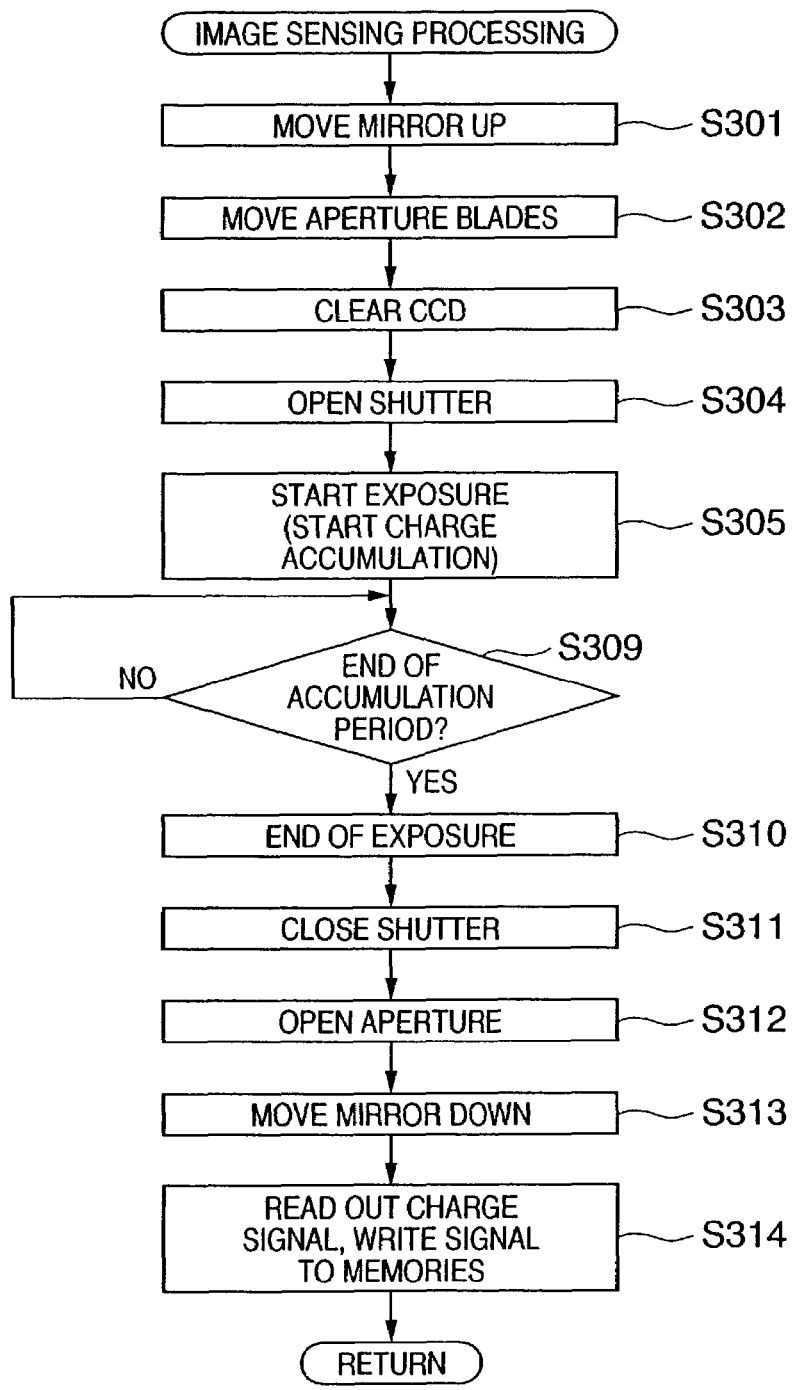
FIG. 11 is a flowchart showing a sequence of an image sensing process performed in step S129 of FIG. 8.

FIG. 11 is a flowchart showing an image sensing sequence performed in step S129. In the image sensing operation, the CPU 117 outputs a control signal to the control circuit 119, in turn, the control circuits 119 controls the aperture driving mechanism 6 and the shutter unit 14.

First, the CPU 117 controls a mirror driving mechanism (not shown) to move the main mirror 7 out of the light path (step S301). Further, using the photometry data stored in the internal memory of the CPU 117, the CPU 117 makes the control circuit 119 control the aperture driving mechanism 6 to move the aperture blades 5 to a predetermined f value (step S302).

Then, the CPU 117 clears charges of the image sensing device 15 (step S303), then makes the control circuit 119 control the shutter unit 14 to open the front aperture blades 14a (step S304).

The electronic digital still camera 1 of this embodiment has an electronic shutter function as described above, charges are accumulated in the image sensing device 15 for a period corresponding to the shutter speed set on the basis of the photometry data stored in the internal memory of the CPU 117 (steps S305 and S309).

The CPU 117 measures the time for the accumulation period and wait for the end of the accumulation period (exposure) (step S309). After the accumulation of charge is completed (step S310), the rear blades 14b of the shutter unit 14 are closed (step S311), thereby the exposure of the image sensing device 15 is finished.

After that, the CPU 117 makes the control circuit 119 control the aperture driving mechanism 4 to drive the aperture blades 5 to an open aperture (step S312), further controls the mirror driving mechanism (not shown) to move the main mirror 7 to a position on the optical path (step S313).

The CPU 117 reads out a charge signal from the image sensing device 15 after the accumulation is finished, converts the signal to a digital signal by the A/D conversion circuits 104 and 105 via the CDS/AGC circuits 102 and 103. The digital signal is written to a predetermined area of the memories 107 and 109 under the control of the memory controllers 106 and 108 (step S314). Then the process is completed.

Figure 12:
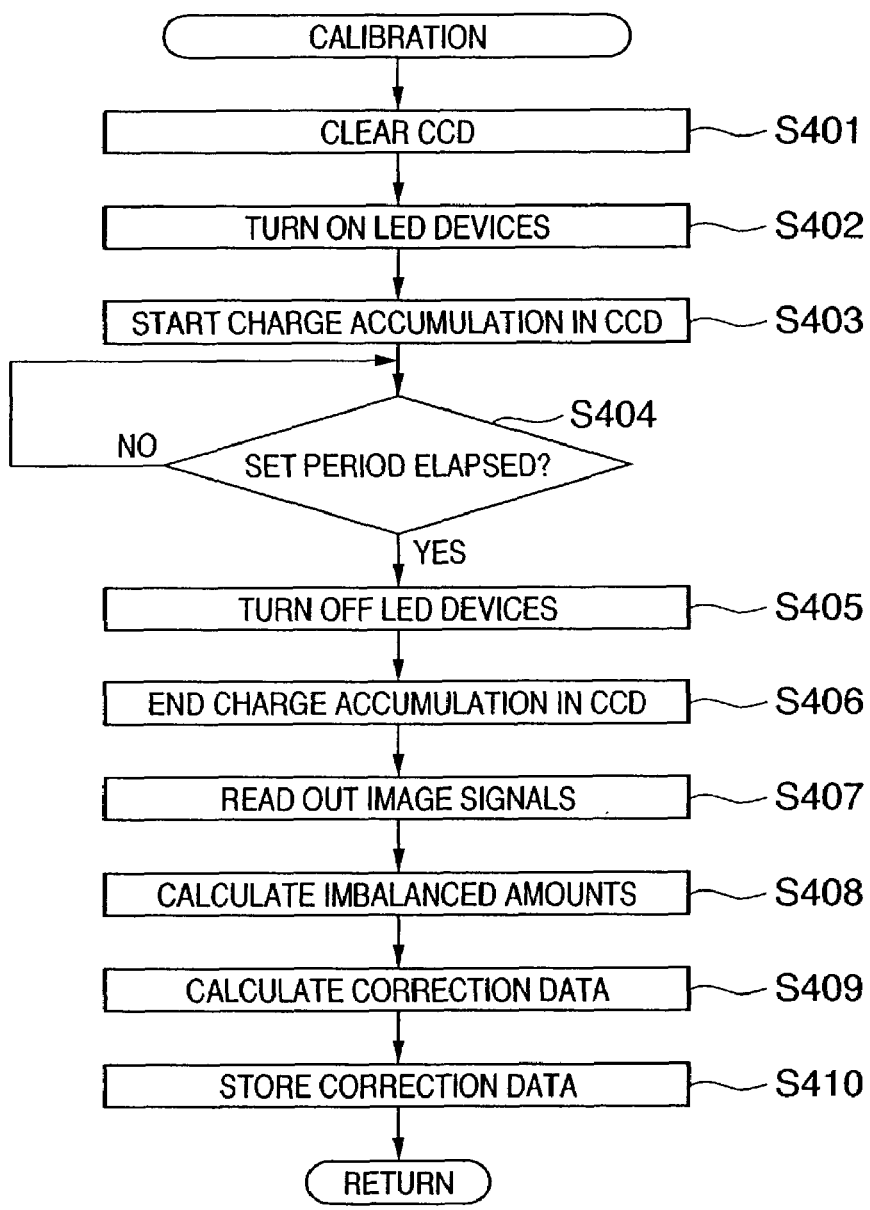
FIG. 12 is a flowchart showing a sequence of a calibration process performed in step S123 of FIG. 8 and step S137 of FIG. 9.

FIG. 12 is a flowchart showing a sequence of calibration process performed in step S123 and step S137. First, the CPU 117 clears charges from the image sensing device 15 (step S401).

Then, with the front blades 14a of the shutter unit 14 being closed, the CPU 117 notifies the imbalanced amount calculating circuit 116 of the calibration process being in progress. Further, the CPU 117 outputs an instruction, to the driver 120, to turn on the LED devices 17a and 17b for calibration for a predetermined period, thereby the image sensing surface is illuminated (step S402).

Thus, accumulation of charges of an image due to illuminated light starts (step S403). Whether or not a set accumulation period has passed is determined (step S404), and if YES, the CPU 117 turns off the LED devices 17a and 17b (step S405), and ends the charge accumulation (step S406).

Thereafter, charges are read out (step S407). In this read out process, a CH1 signal and a CH2 signal are outputted from the right and left half area 15c and 15d of the image sensing device 15, inputted to the CDS/AGC circuits 103 and 102, respectively. After the signals are processed in the CDS/AGC circuits 103 and 102 as described above, the signals enter the A/D conversion circuits 105 and 104, and are converted into digital signals.

The digital signals (AD-CH1 and AD-CH2) outputted from the A/D conversion circuits 105 and 104 are inputted to the imbalanced amount calculating circuit 116, where imbalanced amounts are calculated in the aforesaid method (step S408). Then, optimal correction amounts (correction data) are calculated on the basis of the calculated imbalanced amounts (step S409). The calculated imbalanced amounts and the optimal correction amounts (correction data) are stored in the memory 118 (step S410), and the process is ended.

The developing process is performed using the correction data calculated in the calibration process, thereby imbalanced amounts of image signals outputted from the right and left half areas 15c and 15d of the image sensing device 15 can be properly corrected, and the right and left half images can be properly combined into a single image.

The calibration process is performed at a predetermined interval while the release switch (SW1) is pressed, and imbalanced amounts and correction amounts (correction data) which are calculated in the calibration processes are accumulated and stored in the memory 118, and therefore, more accurate correction data can be set.

In the above embodiment, a first switch circuit for initiating the calibration process is the release switch (SW1) 126, however, the power switch 131 may be used instead. In such a case, the calibration process starts in response to a turn-on operation of the power switch 131, and the release switch (SW1) 126 or the release switch (SW2) 127 may be set to terminate the calibration process, and the calibration process is repeated at a predetermined interval until the release switch (SW1) 126 or the release switch (SW2) 127 is pressed. In this manner, imbalanced amounts and correction amounts (correction data) calculated in the respective calibration processes are accumulated and stored in the memory 118 since the camera 1 is turned on to the time just before the exposure operation starts, and therefore, more accurate correction data can be obtained.

Further, if the power switch 131 is ON after the exposure operation, by repeating the calibration process at a predetermined interval, latest correction data can be calculated in each calibration process.

Alternatively, a switch for initiating the calibration process may be the mode setting unit 128, the single/sequential switch 129, or any operation button of the operation unit 130 which are operated after turning on the power switch 131. In such cases, after the power switch 131 is turned on, when a user operates any of the foregoing switches or buttons for setting various image sensing conditions for preparing for image sensing processing, the calibration process is initiated. Further, the release switch (SW1) 126 or the release switch (SW2) 127 are set to be a switch for terminating the calibration process, and the calibration process is repeated at a predetermined interval until the release switch (SW1) 126 or the release switch (SW2) 127 are pressed. In this manner, imbalanced amounts and correction amounts (correction data) are calculated in the respective calibration processes until just before the exposure operation starts, and more data are accumulated and stored in the memory 118; therefore, more accurate correction data can be obtained.

Figure 13:
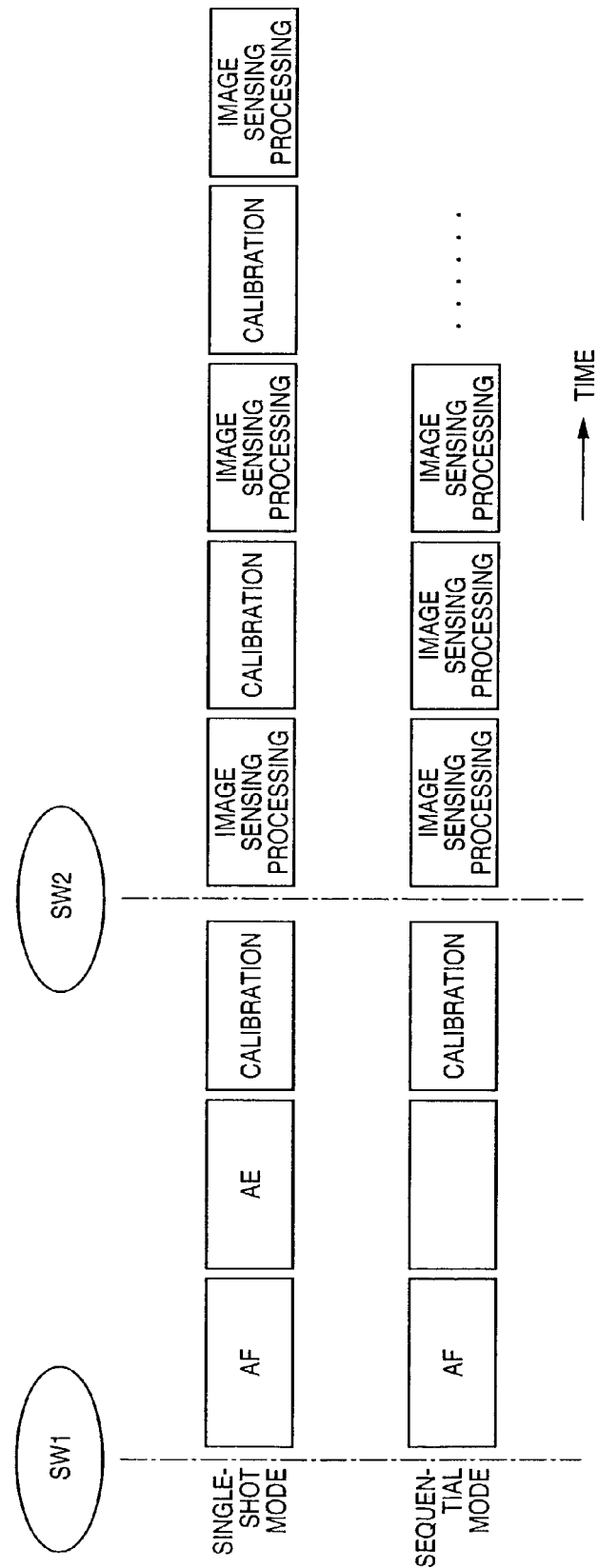
FIG. 13 is a diagram showing a flow of the image sensing process including the calibration process.
Figure 14:
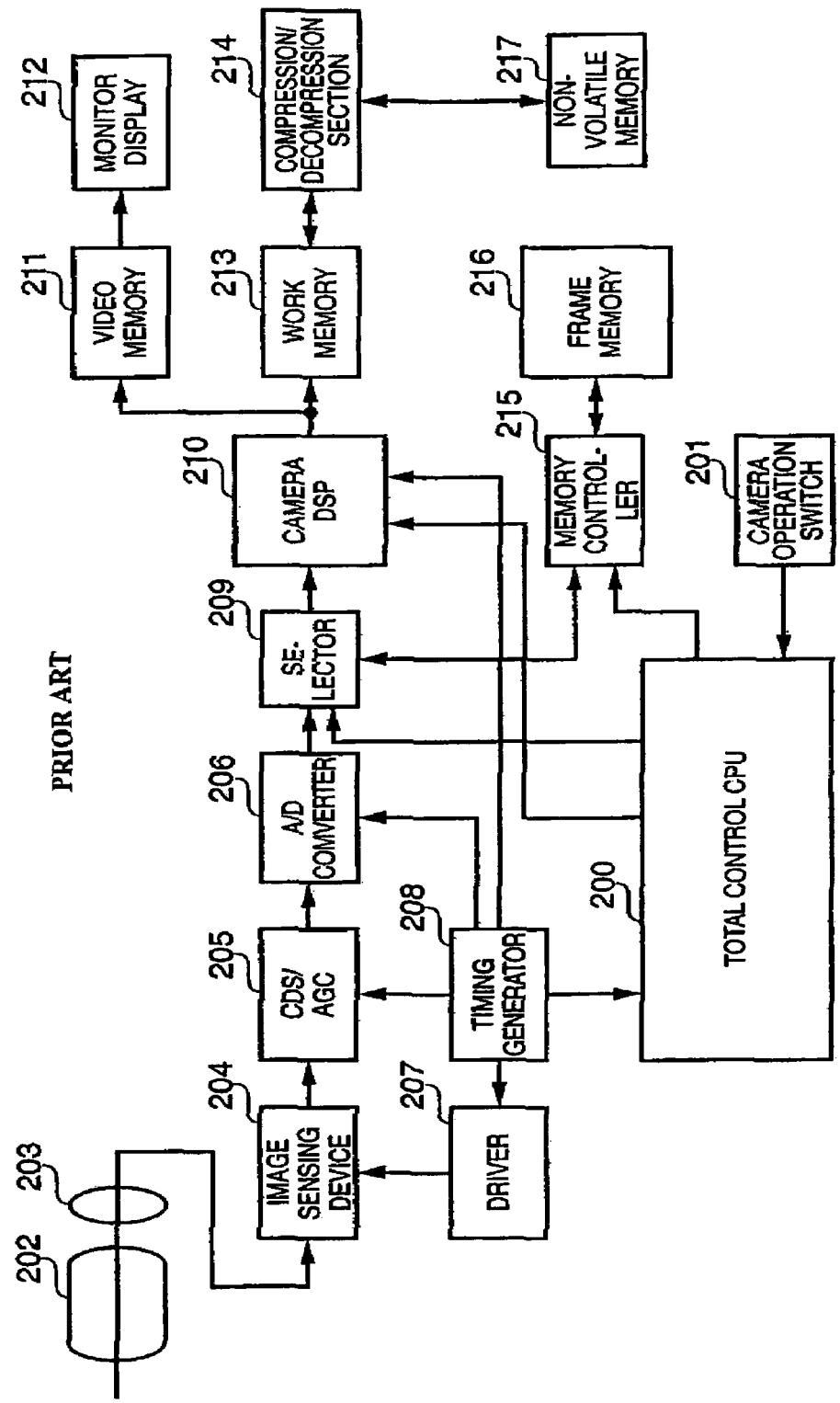
FIG. 14 is a block diagram showing the entire structure of a conventional digital still camera.
Figure 15:
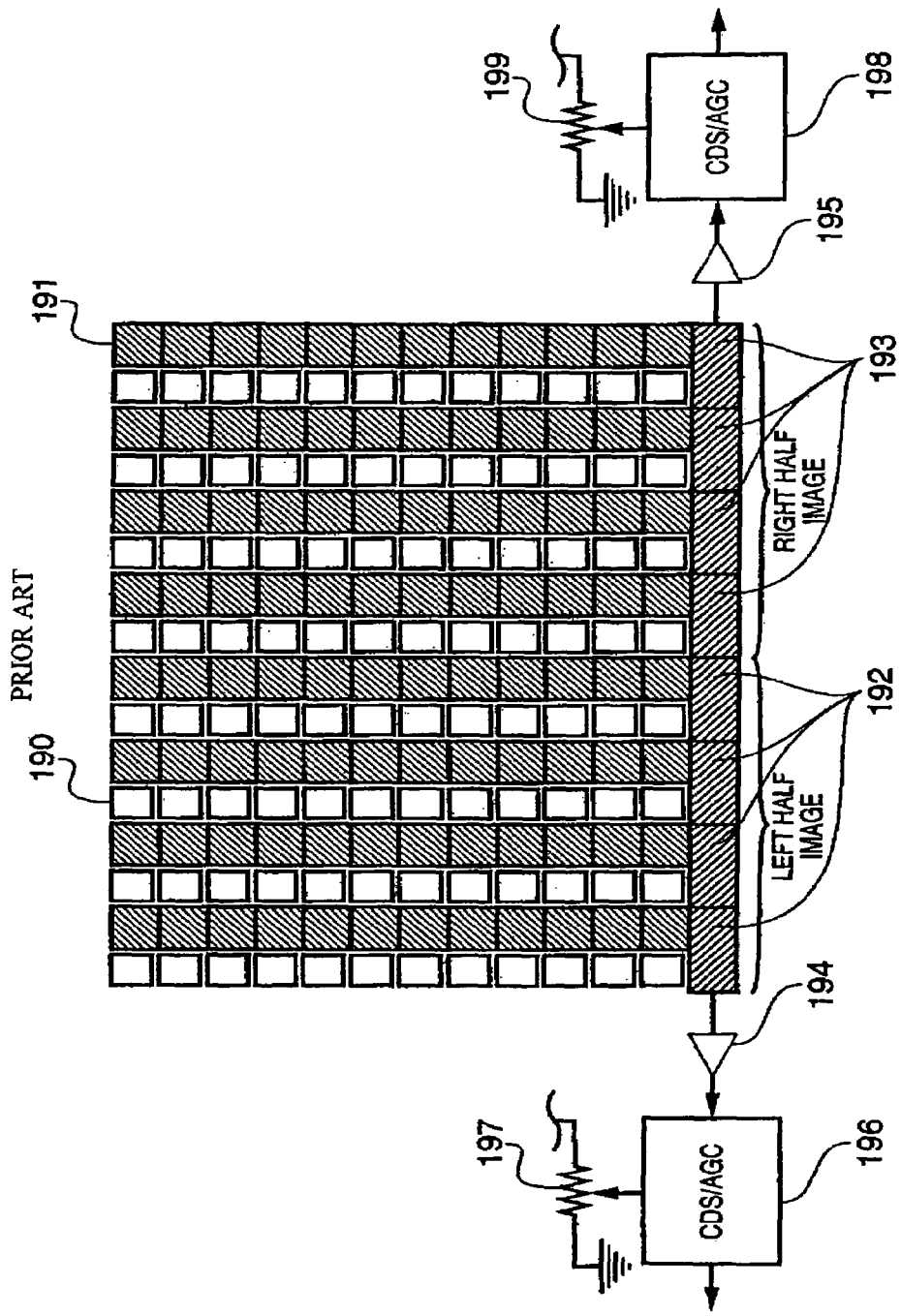
FIG. 15 is a schematic diagram showing a conventional configuration of a two-output type CCD device.

FIG. 13 shows a flow of an image sensing operation including the calibration process. In the single-shot mode, when the release switch (SW1) 126 is pressed, the calibration process is performed after the AF and AE processes are performed. In addition, each time after the release switch (SW2) 127 is pressed and image sensing processing is finished, the calibration process is performed. In the sequential mode, when the release switch (SW1) 126 is pressed, the calibration process is performed after the AF and AE processes are performed. In the sequential mode, when the release switch (SW2) 127 is pressed, image sensing processing is consecutively performed without performing the calibration process.

According to the embodiment as described above, correction of combining the images can be performed precisely. Further, at the time of initiating image sensing processing, calculation of correction data is terminated even when the calculation is in progress, it is possible to reduce the release time lag, thereby a user may not miss a shutter chance.

Further, in the sequential mode, correction data is calculated in advance of initiation of image sensing processing, and the same correction data is used in combining the images sensed in sequence. In this manner, since the correction data is not calculated for each image sensing processing, it is possible to avoid a decrease in speed of sequential image sensing processing and realize high-speed sequential image sensing processing.

When an image sensing device having a plurality of output terminals are used in a digital camera, for instance, a calibration process for acquiring correction data is performed just before the initiation of the image sensing processing without increasing a release time lag. In addition, it is possible to obtain optimal correction data without decreasing the speed of the sequential image sensing processing.

Further, in the above embodiment, an image sensing device whose image sensing area is divided into two areas is described; however, the present invention is not limited to this, and the image sensing area may be divided into three or more areas.

OTHER EMBODIMENT

The present invention can be applied to a system constituted by a plurality of devices (e.g., host computer, interface, camera head) or to an apparatus comprising a single device (e.g., digital still camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and LAN, can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 7 to 12 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image sensing apparatus capable of operating in at least a single-shot mode and a sequential mode, comprising:
    an image sensing device which senses an optical image of an object and outputs charge signals, wherein an image sensing area thereof is divided into a plurality of areas and the charge signals are read out from the respective divided areas;
    a plurality of image processing units adapted to respectively process the charge signals read out from the plurality of divided areas of said image sensing device and output a plurality of image signals;
    a light source adapted to illuminate the plurality of divided areas of said image sensing device;
    a correction data acquisition unit adapted to acquire correction data for correcting a difference, resulted from variation in characteristics of said plurality of image processing units, between a plurality of image signals on the basis of a plurality of image signals obtained by reading charge signals from the plurality of divided areas of said image sensing device with shielding external light toward said image sensing device and illuminating said image sensing device with said light source, and processing the read charge signals by said plurality of image processing units;
    a correction unit adapted to correct the plurality of image signals using the correction data;
    a combining unit adapted to combine the plurality of image signals corrected by said correction unit to generate a combined image signal of a single image; and
    a controller adapted to control to obtain correction data by said correction data acquisition unit for each image sensing processing in the single-shot mode, and to stop an operation of said correction data acquisition unit while consecutively performing image sensing processing in the sequential mode.

2. The image sensing apparatus according to claim 1, wherein said correction data acquisition unit obtains the correction data before initiating image sensing processing.

3. The image sensing apparatus according to claim 1, wherein said correction data acquisition unit obtains the correction data after finishing image sensing processing.

4. The image sensing apparatus according to claim 2, wherein said controller terminates an operation of said correction data acquisition unit when start of image sensing processing is instructed if acquisition of the correction data has not finished, and restarts the operation of the said correction data acquisition unit to obtain the correction data after the image sensing processing is finished.

5. The image sensing apparatus according to claim 1 further comprising a shutter release switch adapted to instruct said correction data acquisition unit to start acquiring correction data in response to a first-stage operation of the shutter release switch, and instruct initiation of image sensing processing in response to a second-stage operation of the shutter release switch.

6. The image sensing apparatus according to claim 5, wherein said correction data acquisition unit repeatedly acquires correction data while said shutter release switch is in the first-stage operation.

7. The image sensing apparatus according to claim 1 further comprising a memory for storing the correction data acquired by said correction data acquisition unit,
wherein said correction unit corrects the plurality of image signals using the correction data stored in said memory.

8. The image sensing apparatus according to claim 7, wherein said correction unit corrects the plurality of image signals using the same correction data stored in said memory while consecutively performing image sensing processing in the sequential mode.

9. A control method of an image sensing apparatus which processes charge signals read from a plurality of image sensing areas of an image sensing device by a plurality of image processing units, respectively, outputs and combines a plurality of processed image signals to generate a combined image signal of a single image, and is capable of operating in at least a single-shot mode and a sequential mode, said method comprising:
acquiring correction data for correcting a difference, resulted from variation in characteristics of the plurality of image processing units, between a plurality of image signals on the basis of a plurality of image signals obtained by reading charge signals from the plurality of image sensing areas of the image sensing device with shielding external light toward the image sensing device and illuminating the image sensing device with a light source, and processing the read charge signals by the plurality of image processing units; and
controlling to obtain correction data for each image sensing processing in the single-shot mode, and to stop obtaining correction data while consecutively performing image sensing processing in the sequential mode,
wherein the combined image signal of the single image is obtained by combining a plurality of image signals corrected by using the correction data.

10. A storage medium which is readable by an information processing apparatus and stores a program which is executable by the information processing apparatus and has a program code for realizing the information processing method defined in claim 9.

* * * * *